United States Patent
Finch et al.

(10) Patent No.: US 10,438,175 B2
(45) Date of Patent: Oct. 8, 2019

(54) SECURE REAL-TIME PAYMENT TRANSACTIONS

(71) Applicant: Early Warning Services, LLC, Scottsdale, AZ (US)

(72) Inventors: Paul Finch, Scottsdale, AZ (US); Lou Anne Alexander, Scottsdale, AZ (US)

(73) Assignee: EARLY WARNING SERVICES, LLC, Scottsdale, AZ (US)

( * ) Notice: Subject to any disclaimer, the term of this patent is extended or adjusted under 35 U.S.C. 154(b) by 878 days.

(21) Appl. No.: 14/805,214

(22) Filed: Jul. 21, 2015

(65) Prior Publication Data

US 2017/0024744 A1    Jan. 26, 2017

(51) Int. Cl.
*G06Q 20/02* (2012.01)
*G06Q 20/08* (2012.01)
(Continued)

(52) U.S. Cl.
CPC ......... *G06Q 20/02* (2013.01); *G06Q 20/0855* (2013.01); *G06Q 20/20* (2013.01);
(Continued)

(58) Field of Classification Search
CPC .. G06Q 20/204; G06Q 20/20; G06Q 20/3224; G06Q 20/4014; G06Q 20/40145;
(Continued)

(56) References Cited

U.S. PATENT DOCUMENTS

| | | |
|---|---|---|
| 2,011,032 A | 8/1935 | Blanchard |
| 5,229,764 A | 7/1993 | Matchett et al. |

(Continued)

FOREIGN PATENT DOCUMENTS

| | | |
|---|---|---|
| AU | 4034997 | 3/1998 |
| AU | 1757201 | 5/2001 |

(Continued)

OTHER PUBLICATIONS

Chang, Yung Fu, C. S. Chen, and Hao Zhou. "Smart phone for mobile commerce." Computer Standards & Interfaces 31.4 (2009):740-747.*

(Continued)

*Primary Examiner* — Asfand M Sheikh
(74) *Attorney, Agent, or Firm* — Bryan Cave Leighton Paisner LLP

(57) ABSTRACT

A method can include receiving, at a first financial institution from a mobile device of a consumer, a first request to pay a merchant for a payment amount from a first account of the consumer maintained by the first financial institution. The method also can include determining, at the first financial institution, second information including an account identifier of a second account of the merchant maintained by a second financial institution, at least partially based on the merchant identifier and third information obtained from a first system. The method additionally can include authorizing, at the first financial institution, a payment from the first account to the second account. The method further can include sending, from the first financial institution to the first system, payment information regarding a deposit to be made in the second account from the first account. Other embodiments are provided.

22 Claims, 7 Drawing Sheets

(51) Int. Cl.
   *G06Q 20/20* (2012.01)
   *G06Q 20/40* (2012.01)
   *G06Q 20/32* (2012.01)

(52) U.S. Cl.
   CPC ....... *G06Q 20/204* (2013.01); *G06Q 20/3224* (2013.01); *G06Q 20/401* (2013.01); *G06Q 20/4014* (2013.01); *G06Q 20/40145* (2013.01)

(58) Field of Classification Search
   CPC ... G06Q 20/02; G06Q 20/0855; G06Q 20/401
   See application file for complete search history.

(56) References Cited

U.S. PATENT DOCUMENTS

| | | |
|---|---|---|
| 5,282,249 A | 1/1994 | Cohen et al. |
| 5,283,829 A | 2/1994 | Anderson |
| 5,329,589 A | 7/1994 | Fraser et al. |
| 5,383,113 A | 1/1995 | Kight et al. |
| 5,453,601 A | 9/1995 | Rosen |
| 5,455,407 A | 10/1995 | Rosen |
| 5,465,206 A | 11/1995 | Hilt et al. |
| 5,481,609 A | 1/1996 | Cohen et al. |
| 5,619,657 A | 4/1997 | Sudama et al. |
| 5,642,419 A | 6/1997 | Rosen |
| 5,649,117 A | 7/1997 | Landry |
| 5,652,786 A | 7/1997 | Rogers |
| 5,671,280 A | 9/1997 | Rosen |
| 5,677,955 A | 10/1997 | Doggett et al. |
| 5,699,528 A | 12/1997 | Hogan |
| 5,703,344 A | 12/1997 | Bezy et al. |
| 5,729,594 A | 3/1998 | Klingman |
| 5,745,886 A | 4/1998 | Rosen |
| 5,781,723 A | 7/1998 | Yee et al. |
| 5,790,677 A | 8/1998 | Fox et al. |
| 5,826,241 A | 10/1998 | Stein et al. |
| 5,832,460 A | 11/1998 | Bednar et al. |
| 5,848,161 A | 12/1998 | Luneau et al. |
| 5,848,400 A | 12/1998 | Chang |
| 5,870,473 A | 2/1999 | Boesch et al. |
| 5,873,072 A | 2/1999 | Kight et al. |
| 5,878,141 A | 3/1999 | Daly et al. |
| 5,884,288 A | 3/1999 | Chang et al. |
| 5,889,863 A | 3/1999 | Weber |
| 5,903,721 A | 5/1999 | Sixtus |
| 5,913,203 A | 6/1999 | Wong et al. |
| 5,915,023 A | 6/1999 | Bernstein |
| 5,920,848 A | 7/1999 | Schutzer et al. |
| 5,946,669 A | 8/1999 | Polk |
| 5,956,700 A | 9/1999 | Landry |
| 5,970,475 A | 10/1999 | Barnes et al. |
| 5,978,840 A | 11/1999 | Nguyen et al. |
| 5,983,208 A | 11/1999 | Haller et al. |
| 5,987,132 A | 11/1999 | Rowney |
| 5,987,140 A | 11/1999 | Rowney et al. |
| 5,996,076 A | 11/1999 | Rowney et al. |
| 5,999,625 A | 12/1999 | Bellare et al. |
| 6,002,767 A | 12/1999 | Kramer |
| 6,016,484 A | 1/2000 | Williams et al. |
| 6,029,150 A | 2/2000 | Kravitz |
| 6,032,133 A | 2/2000 | Hilt et al. |
| 6,035,285 A | 3/2000 | Schlect et al. |
| 6,039,250 A | 3/2000 | Ito et al. |
| 6,044,362 A | 3/2000 | Neely |
| 6,049,786 A | 4/2000 | Smorodinsky |
| 6,058,380 A | 5/2000 | Anderson et al. |
| 6,061,665 A | 5/2000 | Bahreman |
| 6,070,150 A | 5/2000 | Remington et al. |
| 6,072,870 A | 6/2000 | Nguyen et al. |
| 6,078,907 A | 6/2000 | Lamm |
| 6,081,790 A | 6/2000 | Rosen |
| 6,085,168 A | 7/2000 | Mori et al. |
| 6,112,181 A | 8/2000 | Shear et al. |
| 6,119,101 A | 9/2000 | Peckover |
| 6,119,106 A | 9/2000 | Mersky et al. |
| 6,119,107 A | 9/2000 | Polk |
| 6,125,352 A | 9/2000 | Franklin et al. |
| 6,128,603 A | 10/2000 | Dent et al. |
| 6,138,107 A | 10/2000 | Elgamal |
| 6,145,738 A | 11/2000 | Stinson et al. |
| 6,167,378 A | 12/2000 | Webber, Jr. |
| 6,173,272 B1 | 1/2001 | Thomas et al. |
| 6,236,981 B1 | 5/2001 | Hill |
| 6,246,996 B1 | 6/2001 | Stein et al. |
| 6,260,024 B1 | 7/2001 | Shkedy |
| 6,285,991 B1 | 9/2001 | Powar |
| 6,289,322 B1 | 9/2001 | Kitchen et al. |
| 6,292,211 B1 | 9/2001 | Pena |
| 6,292,789 B1 | 9/2001 | Schutzer |
| 6,304,857 B1 | 10/2001 | Heindel et al. |
| 6,304,860 B1 | 10/2001 | Martin, Jr. et al. |
| 6,311,170 B1 | 10/2001 | Embrey |
| 6,317,745 B1 | 11/2001 | Thomas et al. |
| 6,334,116 B1 | 12/2001 | Ganesan et al. |
| 6,381,582 B1 | 4/2002 | Walker et al. |
| 6,385,595 B1 | 5/2002 | Kolling |
| 6,411,942 B1 | 6/2002 | Fujimoto |
| 6,438,527 B1 | 8/2002 | Powar |
| 6,446,051 B1 | 9/2002 | Gupta |
| 6,488,203 B1 | 12/2002 | Stoutenburg et al. |
| 6,502,747 B1 | 1/2003 | Stoutenburg et al. |
| 6,578,015 B1 | 6/2003 | Haseltine et al. |
| 6,587,550 B2 | 7/2003 | Council et al. |
| 6,594,647 B1 | 7/2003 | Randle et al. |
| 6,609,114 B1 | 8/2003 | Gressel et al. |
| 6,647,376 B1 | 11/2003 | Farrar et al. |
| 6,678,664 B1 | 1/2004 | Ganesan |
| 6,839,687 B1 | 1/2005 | Dent et al. |
| 6,847,708 B1 | 1/2005 | Abbasi et al. |
| 6,868,391 B1 | 3/2005 | Hultgren |
| 6,882,986 B1 | 4/2005 | Heinemann et al. |
| 6,968,319 B1 | 11/2005 | Remington et al. |
| 6,996,542 B1 | 2/2006 | Landry |
| 7,003,480 B2 | 2/2006 | Fox et al. |
| 7,004,382 B2 | 2/2006 | Sandru |
| 7,010,512 B1 | 3/2006 | Gillin et al. |
| 7,031,939 B1 | 4/2006 | Gallagher et al. |
| 7,035,821 B1 | 4/2006 | Smith, II et al. |
| 7,039,951 B1 | 5/2006 | Chaudhari et al. |
| 7,051,001 B1 | 5/2006 | Slater |
| 7,089,208 B1 | 8/2006 | Levchin et al. |
| 7,098,783 B2 | 8/2006 | Crichlow |
| 7,120,606 B1 | 10/2006 | Ranzini et al. |
| 7,120,608 B1 | 10/2006 | Gallagher et al. |
| 7,133,835 B1 | 11/2006 | Fusz et al. |
| 7,184,980 B2 | 2/2007 | Allen-Rouman et al. |
| 7,191,151 B1 | 3/2007 | Nosek |
| 7,200,551 B1 | 4/2007 | Senez |
| 7,206,938 B2 | 4/2007 | Bender et al. |
| 7,227,950 B2 | 6/2007 | Faith et al. |
| 7,240,031 B1 | 7/2007 | Kight et al. |
| 7,249,098 B2 | 7/2007 | Milberger et al. |
| 7,287,009 B1 | 10/2007 | Liebermann |
| 7,296,004 B1 | 11/2007 | Garrison et al. |
| 7,302,411 B2 | 11/2007 | Ganesan et al. |
| 7,319,855 B1 | 1/2008 | Brune et al. |
| 7,321,874 B2 | 1/2008 | Dilip et al. |
| 7,321,875 B2 | 1/2008 | Dilip et al. |
| 7,333,953 B1 | 2/2008 | Banaugh et al. |
| 7,349,871 B2 * | 3/2008 | Labrou ............... G06Q 20/02 705/26.35 |
| 7,353,203 B1 | 4/2008 | Kriplani et al. |
| 7,366,695 B1 | 4/2008 | Allen-Rouman et al. |
| 7,370,014 B1 | 5/2008 | Vasavada et al. |
| 7,376,587 B1 | 5/2008 | Neofytides et al. |
| 7,383,223 B1 | 6/2008 | Dilip et al. |
| 7,383,226 B2 | 6/2008 | Kight et al. |
| 7,389,917 B2 | 6/2008 | Abraham et al. |
| 7,392,223 B1 | 6/2008 | Ganesan et al. |
| 7,395,241 B1 | 7/2008 | Cook et al. |
| 7,398,252 B2 | 7/2008 | Neofytides et al. |
| 7,426,492 B1 | 9/2008 | Bishop et al. |
| 7,450,010 B1 | 11/2008 | Gravelle et al. |
| 7,451,114 B1 | 11/2008 | Matsuda et al. |

(56) References Cited

U.S. PATENT DOCUMENTS

| | | |
|---|---|---|
| 7,475,039 B2 | 1/2009 | Remington et al. |
| 7,475,808 B1 | 1/2009 | Bishop et al. |
| 7,478,066 B2 | 1/2009 | Remington et al. |
| 7,505,937 B2 | 3/2009 | Dilip et al. |
| 7,519,560 B2 | 4/2009 | Lam et al. |
| 7,532,122 B2 | 5/2009 | Aull et al. |
| 7,536,722 B1 | 5/2009 | Saltz et al. |
| 7,596,701 B2 | 9/2009 | Varghese et al. |
| 7,603,311 B1 | 10/2009 | Yadav-Ranjan |
| 7,606,734 B2 | 10/2009 | Baig et al. |
| 7,606,787 B2 | 10/2009 | Keown et al. |
| 7,610,245 B2 | 10/2009 | Dent et al. |
| 7,613,653 B2 | 11/2009 | Milberger et al. |
| 7,620,602 B2 | 11/2009 | Jakstadt et al. |
| 7,644,037 B1 | 1/2010 | Ostrovsky |
| 7,653,591 B1 | 1/2010 | Dabney |
| 7,657,497 B2 | 2/2010 | Nandy |
| 7,677,438 B2 | 3/2010 | DeJean et al. |
| 7,685,067 B1 | 3/2010 | Britto et al. |
| 7,689,482 B2 | 3/2010 | Lam et al. |
| 7,693,791 B2 | 4/2010 | Hahn-Carlson et al. |
| 7,702,579 B2 | 4/2010 | Neely et al. |
| 7,707,082 B1 | 4/2010 | Lapstun et al. |
| 7,707,107 B2 | 4/2010 | Gebb et al. |
| 7,711,690 B1 | 5/2010 | Garrison et al. |
| 7,716,127 B2 | 5/2010 | Gebb et al. |
| 7,716,132 B1 | 5/2010 | Spies et al. |
| 7,720,754 B1 | 5/2010 | Gutierrez-Sheris |
| 7,720,756 B2 | 5/2010 | Kavounas |
| 7,734,543 B2 | 6/2010 | Braco |
| 7,752,130 B2 | 7/2010 | Byrd et al. |
| 7,756,785 B2 | 7/2010 | Gebb et al. |
| 7,756,786 B2 | 7/2010 | Trende et al. |
| 7,765,156 B2 | 7/2010 | Staniar et al. |
| 7,769,687 B2 | 8/2010 | Gebb et al. |
| 7,774,271 B1 | 8/2010 | Edwards et al. |
| 7,778,901 B2 | 8/2010 | Ganesan et al. |
| 7,783,567 B1 | 8/2010 | Kleiman et al. |
| 7,792,749 B2 | 9/2010 | Ganesan |
| 7,809,650 B2 | 10/2010 | Bruesewitz et al. |
| 7,840,520 B2 | 11/2010 | Nandy |
| 7,848,972 B1 | 12/2010 | Sharma |
| 7,856,384 B1 | 12/2010 | Kulasooriya et al. |
| 7,870,070 B2 | 1/2011 | Meier et al. |
| 7,873,573 B2 | 1/2011 | Realini |
| 7,877,325 B2 | 1/2011 | Bishop et al. |
| 7,885,869 B2 | 2/2011 | Uehara et al. |
| 7,899,744 B2 | 3/2011 | Bishop et al. |
| 7,904,385 B2 | 3/2011 | Bishop et al. |
| 7,908,214 B2 | 3/2011 | Bishop et al. |
| 7,925,585 B2 | 4/2011 | Bishop et al. |
| 7,937,312 B1 | 5/2011 | Woolston |
| 7,941,367 B2 | 5/2011 | Bishop et al. |
| 7,941,372 B2 | 5/2011 | Bishop et al. |
| 7,942,321 B2 | 5/2011 | Linton et al. |
| 7,945,491 B2 | 5/2011 | Sharma |
| 7,953,660 B2 | 5/2011 | Ganesan et al. |
| 7,958,030 B2 | 6/2011 | Kemper et al. |
| 7,958,049 B2 | 6/2011 | Jamison et al. |
| 7,962,406 B2 | 6/2011 | Bishop et al. |
| 7,962,407 B2 | 6/2011 | Bishop et al. |
| 7,962,408 B2 | 6/2011 | Bishop et al. |
| 7,970,706 B2 | 6/2011 | Keene |
| 7,979,348 B2 | 7/2011 | Thomas et al. |
| 7,979,349 B2 | 7/2011 | Bishop et al. |
| 7,996,307 B2 | 8/2011 | Bishop et al. |
| 7,996,310 B1 | 8/2011 | Edwards et al. |
| 8,020,005 B2 | 9/2011 | Mani et al. |
| 8,041,606 B2 | 10/2011 | Mascavage, III et al. |
| 8,050,997 B1 | 11/2011 | Nosek et al. |
| 8,060,389 B2 | 11/2011 | Johnson |
| 8,069,115 B2 | 11/2011 | Schoenberg et al. |
| 8,073,772 B2 | 12/2011 | Bishop et al. |
| 8,073,773 B2 | 12/2011 | Kozee et al. |
| 8,086,497 B1 | 12/2011 | Oakes, III |
| 8,103,584 B2 | 1/2012 | Bishop et al. |
| 8,103,585 B2 | 1/2012 | Bishop et al. |
| 8,112,354 B2 | 2/2012 | Lalwani |
| 8,121,894 B2 | 2/2012 | Mason |
| 8,121,945 B2 | 2/2012 | Rackley et al. |
| 8,123,124 B2 | 2/2012 | Salazar et al. |
| 8,126,793 B2 | 2/2012 | Jones |
| 8,165,934 B2 | 4/2012 | Manista et al. |
| 8,165,958 B1 | 4/2012 | McLaughlin et al. |
| 8,180,706 B2 | 5/2012 | Bishop et al. |
| 8,190,514 B2 | 5/2012 | Bishop et al. |
| 8,195,565 B2 | 6/2012 | Bishop et al. |
| 8,229,850 B2 | 7/2012 | Dilip et al. |
| 8,234,212 B2 | 7/2012 | Bishop et al. |
| 8,244,609 B2 | 8/2012 | Prakash et al. |
| 8,249,965 B2 | 8/2012 | Tumminaro |
| 8,249,983 B2 | 8/2012 | Dilip et al. |
| 8,255,278 B1 | 8/2012 | Young et al. |
| 8,255,327 B2 | 8/2012 | Kemper et al. |
| 8,255,336 B2 | 8/2012 | Dilip et al. |
| 8,266,028 B2 | 9/2012 | Bulman et al. |
| 8,266,065 B2 | 9/2012 | Dilip et al. |
| 8,275,704 B2 | 9/2012 | Bishop et al. |
| 8,290,835 B2 | 10/2012 | Homer et al. |
| 8,290,862 B2 | 10/2012 | Sheehan et al. |
| 8,290,863 B2 | 10/2012 | Sheehan et al. |
| 8,311,913 B2 | 11/2012 | Marchetti et al. |
| 8,311,914 B2 | 11/2012 | Marchetti et al. |
| 8,311,937 B2 | 11/2012 | Marchetti et al. |
| 8,311,942 B1 | 11/2012 | Mason |
| 8,321,341 B2 | 11/2012 | Nandy |
| 8,310,346 B2 | 12/2012 | Burbridge et al. |
| 8,341,046 B2 | 12/2012 | Marchetti et al. |
| 8,342,407 B2 | 1/2013 | Williams et al. |
| 8,352,365 B1 | 1/2013 | Goldberg et al. |
| 8,370,639 B2 | 2/2013 | Azar et al. |
| 8,374,932 B2 | 2/2013 | Marchetti et al. |
| 8,380,177 B2 | 2/2013 | Laracey |
| 8,380,591 B1 | 2/2013 | Kazenas et al. |
| 8,380,622 B2 | 2/2013 | Bushman et al. |
| 8,401,939 B2 | 3/2013 | Lam et al. |
| 8,407,124 B2 | 3/2013 | Uehara et al. |
| 8,407,141 B2 | 3/2013 | Mullen et al. |
| 8,417,628 B2 | 4/2013 | Poplawski et al. |
| 8,423,460 B2 | 4/2013 | Kay et al. |
| 8,433,629 B2 | 4/2013 | Murtaugh et al. |
| 8,458,086 B2 | 6/2013 | Bishop et al. |
| 8,458,774 B2 | 6/2013 | Ganesan |
| 8,467,766 B2 | 6/2013 | Rackley et al. |
| 8,484,104 B1 | 7/2013 | Huributt et al. |
| 8,498,914 B2 | 7/2013 | Hazelhurst |
| 8,521,657 B2 | 8/2013 | Kuebert et al. |
| 8,527,413 B2 | 9/2013 | Heller |
| 8,532,021 B2 | 9/2013 | Tumminaro |
| 8,533,079 B2 | 9/2013 | Sharma |
| 8,549,601 B2 | 10/2013 | Ganesan |
| 8,560,417 B2 | 10/2013 | Mullen et al. |
| 8,596,527 B2 | 12/2013 | Bishop et al. |
| 8,606,640 B2 | 12/2013 | Brody et al. |
| 8,615,457 B2 | 12/2013 | Mullen et al. |
| 8,634,559 B2 | 1/2014 | Brown et al. |
| 8,646,685 B2 | 2/2014 | Bishop et al. |
| 8,666,865 B2 | 3/2014 | Mullen et al. |
| 8,706,641 B2 | 4/2014 | Bruesewitz et al. |
| 8,713,325 B2 | 4/2014 | Ganesan |
| 8,719,905 B2 | 5/2014 | Ganesan |
| 8,738,526 B2 | 5/2014 | Nosek et al. |
| 8,745,699 B2 | 6/2014 | Ganesan |
| 8,751,347 B2 | 6/2014 | Mullen et al. |
| 8,769,784 B2 | 7/2014 | Ganesan et al. |
| 8,775,306 B2 | 7/2014 | Nosek et al. |
| 8,789,153 B2 | 7/2014 | Ganesan |
| 8,794,509 B2 | 8/2014 | Bishop et al. |
| 8,806,592 B2 | 8/2014 | Ganesan |
| 8,814,039 B2 | 8/2014 | Bishop et al. |
| 8,820,633 B2 | 9/2014 | Bishop et al. |
| 8,887,247 B2 | 11/2014 | Ganesan |
| 8,893,237 B2 | 11/2014 | Ganesan |
| 8,938,787 B2 | 1/2015 | Turgeman |

(56) References Cited

U.S. PATENT DOCUMENTS

| | | |
|---|---|---|
| 9,626,664 B2 | 4/2017 | Bouey et al. |
| 9,691,056 B2 | 6/2017 | Bouey et al. |
| 2002/0023054 A1 | 2/2002 | Gillespie |
| 2002/0029193 A1 | 3/2002 | Ranjan et al. |
| 2002/0052852 A1 | 5/2002 | Bozeman |
| 2002/0091635 A1 | 7/2002 | Dilip et al. |
| 2002/0128932 A1 | 9/2002 | Yung et al. |
| 2002/0143634 A1 | 10/2002 | Kumar et al. |
| 2002/0194503 A1 | 12/2002 | Faith et al. |
| 2003/0014316 A1 | 1/2003 | Jaalinoja et al. |
| 2003/0115151 A1 | 6/2003 | Wheeler et al. |
| 2003/0126094 A1 | 7/2003 | Fisher et al. |
| 2003/0220875 A1 | 11/2003 | Lam et al. |
| 2003/0220876 A1 | 11/2003 | Burger et al. |
| 2003/0236728 A1 | 12/2003 | Sunderji et al. |
| 2004/0034594 A1 | 2/2004 | Thomas et al. |
| 2004/0089711 A1 | 5/2004 | Sandru |
| 2004/0158522 A1 | 8/2004 | Brown et al. |
| 2004/0193522 A1 | 9/2004 | Binet et al. |
| 2004/0230489 A1 | 11/2004 | Goldthwaite et al. |
| 2004/0259626 A1 | 12/2004 | Akram et al. |
| 2005/0008148 A1 | 1/2005 | Jacobson |
| 2005/0010523 A1 | 1/2005 | Myklebust et al. |
| 2005/0010786 A1 | 1/2005 | Michener et al. |
| 2005/0069135 A1 | 3/2005 | Brickell |
| 2005/0080716 A1 | 4/2005 | Belyi et al. |
| 2005/0125347 A1 | 6/2005 | Akialis et al. |
| 2005/0137948 A1 | 6/2005 | Kissner et al. |
| 2005/0149455 A1 | 7/2005 | Bruesewitz et al. |
| 2005/0187873 A1 | 8/2005 | Labrou |
| 2005/0246292 A1 | 11/2005 | Sarcanin |
| 2005/0273842 A1 | 12/2005 | Wright et al. |
| 2005/0274793 A1 | 12/2005 | Cantini et al. |
| 2005/0289061 A1 | 12/2005 | Kulakowski |
| 2006/0000892 A1 | 1/2006 | Bonalle |
| 2006/0014532 A1 | 1/2006 | Seligmann |
| 2006/0080727 A1 | 4/2006 | Hammons et al. |
| 2006/0106717 A1 | 5/2006 | Randle et al. |
| 2006/0149632 A1 | 7/2006 | Bhatti et al. |
| 2006/0149635 A1 | 7/2006 | Bhatti et al. |
| 2006/0161772 A1 | 7/2006 | Talstra et al. |
| 2006/0165060 A1 | 7/2006 | Dua |
| 2006/0224470 A1 | 10/2006 | Garcia Ruano et al. |
| 2006/0258397 A1 | 11/2006 | Kaplan et al. |
| 2006/0280339 A1 | 12/2006 | Cho |
| 2006/0287004 A1 | 12/2006 | Fuqua |
| 2006/0287963 A1 | 12/2006 | Steeves et al. |
| 2007/0061590 A1 | 3/2007 | Boye et al. |
| 2007/0106892 A1 | 5/2007 | Engberg |
| 2007/0108269 A1 | 5/2007 | Benco et al. |
| 2007/0136167 A1 | 6/2007 | Dilip et al. |
| 2007/0136168 A1 | 6/2007 | Dilip et al. |
| 2007/0136169 A1 | 6/2007 | Dilip et al. |
| 2007/0168281 A1 | 7/2007 | Bishop et al. |
| 2007/0174189 A1 | 7/2007 | Bishop et al. |
| 2007/0179885 A1 | 8/2007 | Bird et al. |
| 2007/0198264 A1 | 8/2007 | Chang |
| 2007/0198405 A1 | 8/2007 | Bishop et al. |
| 2007/0198406 A1 | 8/2007 | Bishop et al. |
| 2007/0230371 A1 | 10/2007 | Tumminaro |
| 2007/0233615 A1 | 10/2007 | Tumminaro |
| 2007/0236330 A1 | 10/2007 | Cho et al. |
| 2007/0244811 A1 | 10/2007 | Tumminaro |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0255662 A1 | 11/2007 | Tumminaro |
| 2008/0015982 A1 | 1/2008 | Sokolic et al. |
| 2008/0015985 A1 | 1/2008 | Abhari et al. |
| 2008/0015994 A1 | 1/2008 | Bonalle et al. |
| 2008/0032741 A1 | 2/2008 | Tumminaro |
| 2008/0033880 A1 | 2/2008 | Fiebiger et al. |
| 2008/0082454 A1 | 4/2008 | Dilip et al. |
| 2008/0082828 A1 | 4/2008 | Jennings et al. |
| 2008/0086403 A1 | 4/2008 | Dilip et al. |
| 2008/0086426 A1 | 4/2008 | Dilip et al. |
| 2008/0097873 A1 | 4/2008 | Cohen et al. |
| 2008/0097899 A1 | 4/2008 | Jackson et al. |
| 2008/0109392 A1 | 5/2008 | Nandy |
| 2008/0127319 A1 | 5/2008 | Galloway et al. |
| 2008/0140564 A1 | 6/2008 | Tal et al. |
| 2008/0141033 A1 | 6/2008 | Ginter et al. |
| 2008/0147536 A1 | 6/2008 | Breen |
| 2008/0177661 A1 | 7/2008 | Mehra |
| 2008/0208737 A1 | 8/2008 | Dilip et al. |
| 2008/0210751 A1 | 9/2008 | Kim |
| 2008/0210752 A1 | 9/2008 | March |
| 2008/0222048 A1 | 9/2008 | Higgins et al. |
| 2008/0238610 A1 | 10/2008 | Rosenberg |
| 2008/0244271 A1 | 10/2008 | Yu |
| 2008/0244277 A1 | 10/2008 | Orsini et al. |
| 2008/0255993 A1 | 10/2008 | Blinbaum |
| 2008/0294563 A1 | 11/2008 | Boutahar et al. |
| 2008/0306872 A1 | 12/2008 | Felsher |
| 2009/0006861 A1 | 1/2009 | Bemmel |
| 2009/0006920 A1 | 1/2009 | Munson et al. |
| 2009/0030843 A1 | 1/2009 | Hoffman et al. |
| 2009/0043705 A1 | 2/2009 | Bishop et al. |
| 2009/0048885 A1 | 2/2009 | Bishop et al. |
| 2009/0048886 A1 | 2/2009 | Bishop et al. |
| 2009/0048887 A1 | 2/2009 | Bishop et al. |
| 2009/0048951 A1 | 2/2009 | Bishop et al. |
| 2009/0048952 A1 | 2/2009 | Bishop et al. |
| 2009/0048963 A1 | 2/2009 | Bishop et al. |
| 2009/0048966 A1 | 2/2009 | Bishop et al. |
| 2009/0048968 A1 | 2/2009 | Bishop et al. |
| 2009/0048969 A1 | 2/2009 | Bishop et al. |
| 2009/0070272 A1 | 3/2009 | Jain |
| 2009/0076956 A1 | 3/2009 | Bishop et al. |
| 2009/0076957 A1 | 3/2009 | Bishop et al. |
| 2009/0076958 A1 | 3/2009 | Bishop et al. |
| 2009/0083181 A1 | 3/2009 | Bishop et al. |
| 2009/0089193 A1 | 4/2009 | Paintin |
| 2009/0089209 A1 | 4/2009 | Bixler et al. |
| 2009/0099961 A1 | 4/2009 | Ogilvy |
| 2009/0112658 A1 | 4/2009 | Mullen et al. |
| 2009/0112659 A1 | 4/2009 | Mullen et al. |
| 2009/0112660 A1 | 4/2009 | Mullen et al. |
| 2009/0112661 A1 | 4/2009 | Mullen et al. |
| 2009/0112662 A1 | 4/2009 | Mullen et al. |
| 2009/0112747 A1 | 4/2009 | Mullen et al. |
| 2009/0119190 A1 | 5/2009 | Realini |
| 2009/0119212 A1 | 5/2009 | Liu et al. |
| 2009/0125323 A1 | 5/2009 | Lakshmanan et al. |
| 2009/0125426 A1 | 5/2009 | Bishop et al. |
| 2009/0132392 A1 | 5/2009 | Davis et al. |
| 2009/0132423 A1 | 5/2009 | Liu |
| 2009/0138388 A1 | 5/2009 | Bishop et al. |
| 2009/0150269 A1 | 6/2009 | Bishop et al. |
| 2009/0150270 A1 | 6/2009 | Bishop et al. |
| 2009/0150271 A1 | 6/2009 | Bishop et al. |
| 2009/0150288 A1 | 6/2009 | Bishop et al. |
| 2009/0157518 A1 | 6/2009 | Bishop et al. |
| 2009/0157519 A1 | 6/2009 | Bishop et al. |
| 2009/0164324 A1 | 6/2009 | Bishop et al. |
| 2009/0164325 A1 | 6/2009 | Bishop et al. |
| 2009/0164326 A1 | 6/2009 | Bishop et al. |
| 2009/0164327 A1 | 6/2009 | Bishop et al. |
| 2009/0164328 A1 | 6/2009 | Bishop et al. |
| 2009/0164329 A1 | 6/2009 | Bishop et al. |
| 2009/0164330 A1 | 6/2009 | Bishop et al. |
| 2009/0164331 A1 | 6/2009 | Bishop et al. |
| 2009/0228365 A1 | 9/2009 | Tomchek et al. |
| 2009/0265241 A1 | 10/2009 | Bishop et al. |
| 2009/0265249 A1 | 10/2009 | Bishop et al. |
| 2009/0265250 A1 | 10/2009 | Bishop et al. |
| 2009/0265252 A1 | 10/2009 | Fletcher |
| 2009/0271277 A1 | 10/2009 | Bishop et al. |
| 2009/0271278 A1 | 10/2009 | Bishop et al. |
| 2009/0271303 A1 | 10/2009 | Wang et al. |
| 2009/0282259 A1 | 11/2009 | Skorik et al. |
| 2009/0287564 A1 | 11/2009 | Bishop et al. |
| 2009/0287565 A1 | 11/2009 | Bishop et al. |
| 2009/0287601 A1 | 11/2009 | Tumminaro et al. |

(56) References Cited

U.S. PATENT DOCUMENTS

| | | |
|---|---|---|
| 2009/0289106 A1 | 11/2009 | Bishop et al. |
| 2009/0299841 A1 | 12/2009 | Bishop et al. |
| 2009/0307072 A1 | 12/2009 | Morales-Lema |
| 2009/0319425 A1 | 12/2009 | Tumminaro et al. |
| 2009/0327133 A1* | 12/2009 | Aharoni ............... G06Q 20/10 705/44 |
| 2010/0030687 A1 | 2/2010 | Panthaki et al. |
| 2010/0031022 A1 | 2/2010 | Kramer |
| 2010/0042537 A1 | 2/2010 | Smith et al. |
| 2010/0042539 A1 | 2/2010 | Dheer et al. |
| 2010/0057622 A1 | 3/2010 | Faith et al. |
| 2010/0063935 A1 | 3/2010 | Thomas et al. |
| 2010/0094765 A1 | 4/2010 | Nandy |
| 2010/0100480 A1 | 4/2010 | Altman et al. |
| 2010/0115610 A1 | 5/2010 | Tredoux et al. |
| 2010/0131415 A1 | 5/2010 | Sartipi |
| 2010/0198729 A1 | 8/2010 | Kavounas |
| 2010/0269166 A1 | 10/2010 | Awad et al. |
| 2010/0320266 A1 | 12/2010 | White |
| 2011/0055078 A1 | 3/2011 | Nandy |
| 2011/0055083 A1 | 3/2011 | Grinhute |
| 2011/0066523 A1 | 3/2011 | Harrison |
| 2011/0066551 A1 | 3/2011 | Bruesewitz et al. |
| 2011/0078078 A1 | 3/2011 | Meier et al. |
| 2011/0112945 A1 | 5/2011 | Cullen, III et al. |
| 2011/0112954 A1 | 5/2011 | Bruesewitz et al. |
| 2011/0191160 A1 | 8/2011 | Blackhurst et al. |
| 2011/0202982 A1 | 8/2011 | Alexander et al. |
| 2011/0247058 A1 | 10/2011 | Kisters |
| 2011/0251952 A1 | 10/2011 | Kelly et al. |
| 2011/0258111 A1 | 10/2011 | Raj et al. |
| 2011/0264543 A1 | 10/2011 | Taveau et al. |
| 2011/0264583 A1 | 10/2011 | Cooper et al. |
| 2011/0270749 A1 | 11/2011 | Bennett et al. |
| 2011/0276479 A1 | 11/2011 | Thomas |
| 2011/0295746 A1 | 12/2011 | Thomas et al. |
| 2011/0313921 A1 | 12/2011 | Dheer et al. |
| 2011/0320347 A1 | 12/2011 | Tumminaro et al. |
| 2012/0016731 A1 | 1/2012 | Smith et al. |
| 2012/0041876 A1 | 2/2012 | Nosek et al. |
| 2012/0066121 A1 | 3/2012 | Shahbazi et al. |
| 2012/0116953 A1 | 5/2012 | Klein et al. |
| 2012/0173417 A1 | 7/2012 | Lohman et al. |
| 2012/0203695 A1 | 8/2012 | Morgan et al. |
| 2012/0209766 A1 | 8/2012 | Kitchen et al. |
| 2012/0265687 A1 | 10/2012 | Dilip et al. |
| 2012/0278239 A1 | 11/2012 | Nosek et al. |
| 2012/0284154 A1 | 11/2012 | Creighton et al. |
| 2012/0284175 A1 | 11/2012 | Wilson et al. |
| 2012/0290453 A1 | 11/2012 | Manista et al. |
| 2013/0018791 A1 | 1/2013 | Mendocino et al. |
| 2013/0036000 A1 | 2/2013 | Giordano et al. |
| 2013/0054452 A1 | 2/2013 | Au et al. |
| 2013/0060708 A1 | 3/2013 | Oskolkov et al. |
| 2013/0073455 A1 | 3/2013 | McLaughlin et al. |
| 2013/0080368 A1 | 3/2013 | Nandy |
| 2013/0085936 A1 | 4/2013 | Law et al. |
| 2013/0117178 A1 | 5/2013 | Mullen et al. |
| 2013/0124405 A1 | 5/2013 | Hamzeh |
| 2013/0124406 A1 | 5/2013 | Poplawski et al. |
| 2013/0138557 A1 | 5/2013 | Mullen et al. |
| 2013/0151384 A1 | 6/2013 | Mullen et al. |
| 2013/0212010 A1 | 8/2013 | Mullen et al. |
| 2013/0226627 A1 | 8/2013 | Kubovcik et al. |
| 2013/0232071 A1 | 9/2013 | Dilip et al. |
| 2013/0238488 A1 | 9/2013 | Bouey et al. |
| 2013/0238489 A1 | 9/2013 | Bouey et al. |
| 2013/0238490 A1 | 9/2013 | Bouey et al. |
| 2013/0238491 A1 | 9/2013 | Bouey et al. |
| 2013/0238492 A1 | 9/2013 | Muthu et al. |
| 2013/0246280 A1 | 9/2013 | Kirsch |
| 2013/0262296 A1 | 10/2013 | Thomas et al. |
| 2013/0282588 A1* | 10/2013 | Hruska ............... G06Q 20/10 705/67 |
| 2014/0006184 A1 | 1/2014 | Godsey |
| 2014/0046820 A1 | 2/2014 | Sunderji et al. |
| 2014/0058862 A1 | 2/2014 | Celkonas |
| 2014/0067677 A1 | 3/2014 | Ali et al. |
| 2014/0081783 A1 | 3/2014 | Paranjape et al. |
| 2014/0164246 A1 | 6/2014 | Thomas et al. |
| 2014/0188697 A1 | 7/2014 | Bruesewitz et al. |
| 2014/0188728 A1 | 7/2014 | Dheer et al. |
| 2014/0244515 A1 | 8/2014 | Garfinkle et al. |
| 2014/0310142 A1 | 10/2014 | Mak |
| 2014/0372308 A1 | 12/2014 | Sheets |
| 2015/0112866 A1 | 4/2015 | Muthu et al. |
| 2016/0283918 A1 | 9/2016 | Weinflash |
| 2016/0300206 A1 | 10/2016 | Novac et al. |
| 2016/0300207 A1 | 10/2016 | Novac et al. |
| 2016/0300225 A1 | 10/2016 | Novac et al. |
| 2016/0300226 A1 | 10/2016 | Novac et al. |
| 2016/0321625 A1 | 11/2016 | Gilliam, III et al. |
| 2017/0024719 A1 | 1/2017 | Finch et al. |

FOREIGN PATENT DOCUMENTS

| | | |
|---|---|---|
| AU | 8870801 | 4/2002 |
| AU | 2002252137 | 9/2002 |
| BR | PI0710021 | 8/2011 |
| BR | PI0710089 | 8/2011 |
| CA | 2229012 | 3/1997 |
| CA | 2239875 | 6/1997 |
| CA | 2323500 | 9/1999 |
| CA | 2329348 | 11/1999 |
| CA | 2316090 | 2/2001 |
| CA | 2402353 | 9/2001 |
| CA | 2423048 | 3/2002 |
| CA | 2437949 | 8/2002 |
| CA | 2436319 | 2/2004 |
| CA | 2647602 | 3/2008 |
| CA | 2647636 | 3/2008 |
| CN | 101454794 | 6/2009 |
| CN | 101454795 | 6/2009 |
| EP | 820620 | 1/1998 |
| EP | 865010 | 9/1998 |
| EP | 998731 | 5/2000 |
| EP | 1107198 | 6/2001 |
| EP | 1184823 | 3/2002 |
| EP | 1208513 | 5/2002 |
| EP | 1400053 | 3/2004 |
| EP | 1416455 | 5/2004 |
| EP | 1504393 | 2/2005 |
| EP | 2008237 | 12/2008 |
| EP | 2013842 | 1/2009 |
| EP | 2266083 | 12/2010 |
| EP | 2304678 | 4/2011 |
| EP | 2344994 | 7/2011 |
| EP | 2387772 | 11/2011 |
| EP | 2407918 | 1/2012 |
| EP | 2407919 | 1/2012 |
| EP | 2438562 | 4/2012 |
| GB | 2297856 | 8/1996 |
| GB | 2384084 | 7/2003 |
| GB | 2454614 | 5/2009 |
| JP | 09282367 | 10/1997 |
| JP | 2004532448 | 10/2004 |
| JP | 2008262601 | 10/2008 |
| KR | 1020120075590 | 7/2012 |
| KR | 1020140099676 | 8/2014 |
| MX | 2008012503 | 12/2008 |
| MX | 2008012504 | 5/2009 |
| NL | 1018913 | 3/2003 |
| SE | 9703800 | 4/1999 |
| TW | 200919343 | 5/2009 |
| WO | 1997002539 | 1/1997 |
| WO | 1997016798 | 5/1997 |
| WO | 1999024891 | 5/1999 |
| WO | 1999034311 | 7/1999 |
| WO | 1999046720 | 9/1999 |
| WO | 2000055793 | 9/2000 |
| WO | 2000058876 | 10/2000 |
| WO | 2001033522 | 5/2001 |
| WO | 2001055984 | 8/2001 |
| WO | 2001067364 | 9/2001 |

(56) References Cited

FOREIGN PATENT DOCUMENTS

| | | |
|---|---|---|
| WO | 2002025534 | 3/2002 |
| WO | 2002025605 | 3/2002 |
| WO | 2002035429 | 5/2002 |
| WO | 2002069561 | 9/2002 |
| WO | 2003091849 | 11/2003 |
| WO | 2005004026 | 1/2005 |
| WO | 2005057455 | 6/2005 |
| WO | 2007116368 | 10/2007 |
| WO | 2008011102 | 1/2008 |
| WO | 2008027620 | 3/2008 |
| WO | 2008027621 | 3/2008 |
| WO | 2008110791 | 9/2008 |
| WO | 2009058526 | 5/2009 |
| WO | 2009097215 | 8/2009 |
| WO | 2009114876 | 9/2009 |
| WO | 2009152184 | 12/2009 |
| WO | 2009158420 | 12/2009 |
| WO | 2010082960 | 7/2010 |
| WO | 2010083113 | 7/2010 |
| WO | 2010138358 | 12/2010 |
| WO | 2010138359 | 12/2010 |
| WO | 2010138611 | 12/2010 |
| WO | 2010138613 | 12/2010 |
| WO | 2010138615 | 12/2010 |
| WO | 2010141662 | 12/2010 |
| WO | 2011008625 | 1/2011 |
| WO | 2011137082 | 11/2011 |
| WO | 2011163525 | 12/2011 |
| WO | 2012075187 | 6/2012 |
| WO | 2017011596 | 1/2017 |
| WO | 2017014815 | 1/2017 |

OTHER PUBLICATIONS

"Faster, Better, Cheaper—Like it or Not." Carol Coye Benson. http://paymentsviews.com/2013/03/13/faster-better-cheaper-like-it-or-not/ Mar. 13, 2013.

"Greg's diary", Aug. 2009, available at http://www.lemis.com/grog/diary-aug2009.php?dirdate=20090807&imagesizes=11111111111111111113#Photo-19.

Trusted Computing Platform Alliance (TCPA), Main Specification Version 1. 1b, Published by the Trusted Computing Group, 2003, 332 pages.

United States Patent and Trademark Office as the International Searching Authority, International Search Report for PCT/US09/48490, dated Jul. 31, 2009, 1 page.

United States Patent and Trademark Office as the International Searching Authority, International Search Report and Written Opinion for PCT/US11/33828, dated Jul. 12, 2011, 11 pages.

United States Patent and Trademark Office as the International Searching Authority, International Search Report and Written Opinion for PCT/US10/35465, dated Jul. 13, 2010, 7 pages.

United States Patent and Trademark Office as the International Searching Authority, International Search Report and Written Opinion for PCT/US10/36229, dated Jul. 28, 2010, 12 pages.

United States Patent and Trademark Office as the International Searching Authority, International Search Report and Written Opinion for PCT/US10/36233, dated Jul. 28, 2010, 7 pages.

United States Patent and Trademark Office as the International Searching Authority, International Search Report and Written Opinion for PCT/US10/36231, dated Nov. 8, 2010, 8 pages.

International Search Report and Written Opinion from PCT/US2016/026000, dated Jul. 13, 2016, 15 pages.

International Search Report and Written Opinion for PCT/US2016/042163, dated Sep. 26, 2016.

Fiserv, Inc., "Popmoney(R): Instant Payments—Now You Can Deliver Funds in Real Time," Feb. 6, 2014 [retrieved online from https://www.fiserv.com/resources/Popmoney_Instant_Payments_2_06_2014.pdf on Aug. 7, 2015].

Gayle C. Avery, Ellen Baker; Reframing the Infomated Household-Workplace; Information & Organization, 2002, vol. 12, Aug. 2001.

Mark Bernkopf; Electronic Cash and Monetary Policy; First Monday, vol. 1, No. 1-6, May 1996.

Electronic Payment Systems in European Countries; Country Synthesis Report; Böhle, Rader, Riehm, Institut far Technikfolgenabschatzung and Systemanalyse for the European Science and Technology Observatory Network (ESTO); Final Version, Sep. 1999.

Mark E. Budnitz; Electronic Money in the 1990s: A Net Benefit or Merely a Trade-Off?; 9 Ga. St. U. L. Rev. 747, 1992-1993.

Chida, Mambo, Shizuya; Digital Money-A Survey; Received Jun. 15, 2001; Revised Aug. 21, 2001; Interdisciplinary Information Sciences. vol. 7, No. 2, pp. 135-165 (2001).

Harold L. Frohman, William R. Ledder; Defense Transportation's EDI Program: A Security Risk Assessment; PL205LN5; Logistics Management Institute; May 1993.

Aryya Gangopadhyay; Managing Business with Electronic Commerce: Issues & Trends; Idea Group Publishing (2002).

Hans van der Heijden; Factors Affecting the Successful Introduction of Mobile Payment Systems; Vrije Universiteit Amsterdam; 15th Bled Electronic Commerce Conference eReality; Constructing the eEconomy; Bled, Solvenia, Jun. 17-19, 2002.

Lorin M. Hitt and Frances X. Frei; Do Better Customers Utilize Electronic Distribution Channels? The Case of PC Banking; Dec. 2001.

Eun Kim, Petra Schubert, Dorian Seltz and Bumtae Kim; The EBMG Reference Model on Electronic Markets: The Korean Case of Jodal (2007).

Glenbrook Partners; PayPal in the Air!—A look at PayPal Mobile; Payment News; Glenbrook eCommerce Market Analysis Reports (2006).

Sangjo Oh, Heejin Lee, Sherah Kurnia, Robert B. Johnston, Ben Lim; A Stakeholder Perspective on Successful Electronic Payment Systems Diffusion; Proceedings of the 39th Hawaii International Conference on Systems Sciences, 2006.

John R. Palumbo; Naval Postgraduate School, Monterey, California; Thesis, Financial Transaction Mechanisms for World Wide Web Applications, Mar. 1996.

Hua-Fu Pao; Naval Postgraduate School, Monterey, California; Thesis, Security Management of Electronic Data Interchange; Jun. 1993.

Tobern P. Pedersen; Electronic Payments of Small Amounts; Aarhus University (1998).

Eveline Franco Veloso; The Business Revolution through B2B Market Tone and its Impacts over the Financial System gong into 21st Century; The Institute of Brazilian Business and Management Issues; XII Minerva Program—Fall 2000, 2000.

Alladi Venkatesh and Nicholas Vitalari; Households and Technology: The Case of Home Computers—Some Conceptual and Theoretical Issues; originally appeared in M.L. Roberts and L. Wortzel (eds.) Marketing to the Changing Household, Ballinger Publishing, 1985, pp. 187-203.

A. Vilmos and S. Namouskos; SEMOPS: Design of a New Payment Service; International Workshop on Mobile Commerce Technologies & Applications (MCTA 2003), In proceedings of the 14th International Conference DEXA 2003, Sep. 1-5, 2003, Prague, Czech Republic.

Raja Mohn Rosli bin Raja Zulkifli; Building a World Class Infrastructure to Support E-Commerce in Malaysia; 1997 Telekom Malaysia, 1997.

\* cited by examiner

SECURE REAL-TIME PAYMENT TRANSACTIONS

TECHNICAL FIELD

This disclosure relates generally to financial transaction processing, and relates more particularly to a secure real-time payment transactions and networks.

BACKGROUND

In a typical payment card transaction, a consumer provides an account number to a merchant to process a payment from the consumer for a transaction, and the merchant processes the payment transaction through the merchant's bank and/or payment processor ("acquirer"), which requests payment from the consumer's financial institution ("issuer") through a payment processing network (e.g., a credit card network). The request initiated by the merchant for payment from the consumer is a pull-based payment model. The pull-based payment model generally involves significant transaction fees paid to various entities, such as the acquirer, the issuer, and the payment processing network. Moreover, the merchant is generally liable for chargebacks when the consumer's card is used fraudulently. Further, the consumer account information can be subject to theft under this model, as the consumer is providing the consumer's account information to third parties (i.e., parties other than the consumer's financial institution). A request initiated by the consumer, instead of the merchant, to send payment from the consumer's account to the merchant's account is a push-based payment model. The push-based payment model is often used for recurrent bill-pay transactions, but is generally not used for in-store transactions with merchants.

BRIEF DESCRIPTION OF THE DRAWINGS

To facilitate further description of the embodiments, the following drawings are provided in which.

Figure 1:
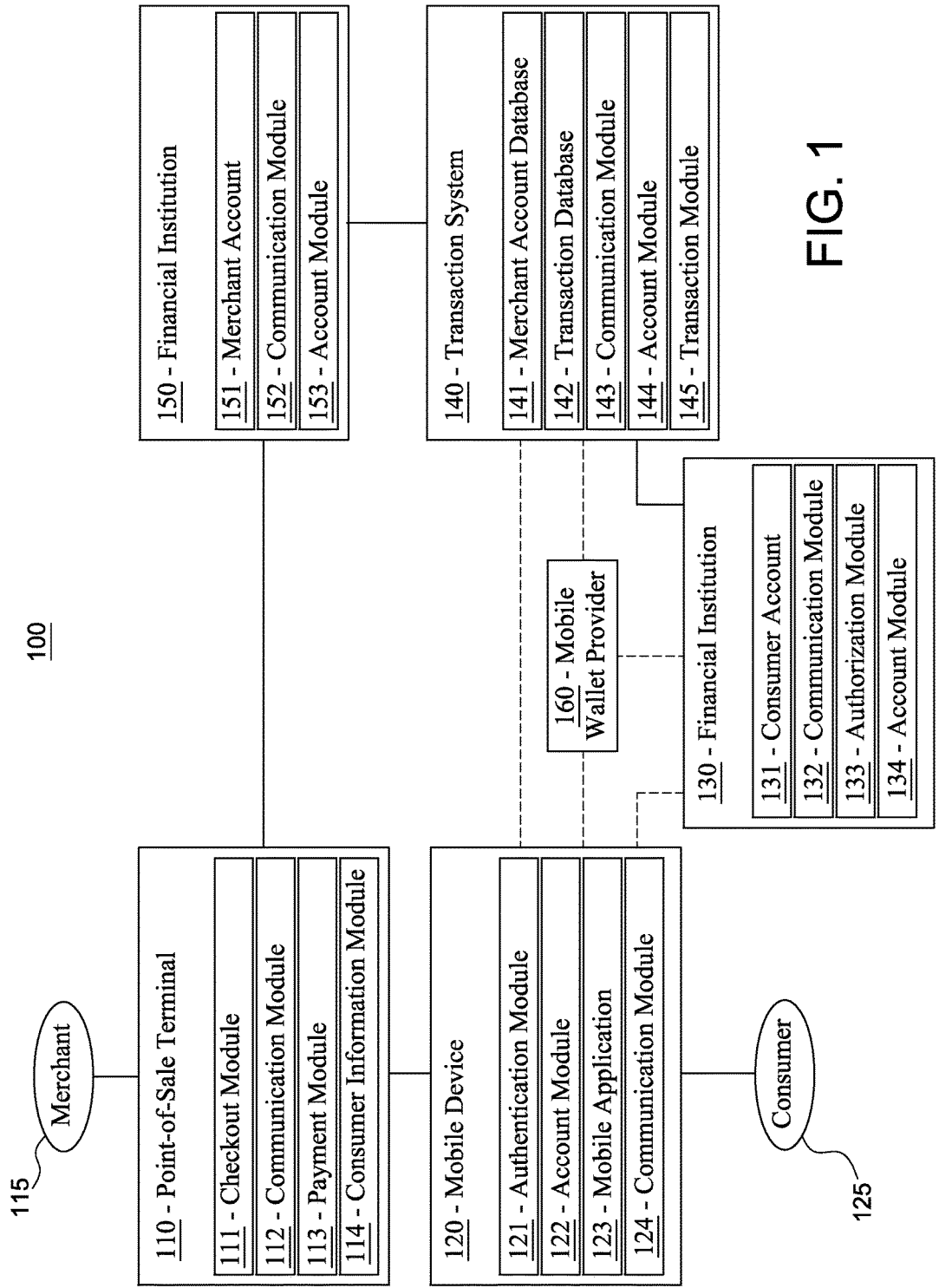
FIG. 1 illustrates a block diagram of a system that can be employed for a secure real-time payment transaction network, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, or five minutes.

Description of Examples of Embodiments

Various embodiments include a system including one or more processing modules and one or more non-transitory memory storage modules storing computing instructions configured to run on the one or more processing modules and perform certain acts. The acts can include receiving, at a first financial institution from a mobile device of a consumer, a first request to pay a merchant for a payment amount from a first account of the consumer maintained by the first financial institution. The first request can include first information including a merchant identifier, a transaction identifier, and the payment amount. The first information can be sent to the first financial institution from a mobile application running on a mobile device used by the consumer at a store of the merchant to pay for one or more items to be purchased from the merchant by the consumer for the payment amount. The merchant identifier can be associated with the merchant. The mobile application can be associated with the first account. The acts also can include determining, at the first financial institution, second information including an account identifier of a second account of the merchant maintained by a second financial institution, at least partially based on the merchant identifier and third information obtained from a first system. The first system can be in data communication with the first financial institution and the second financial institution. The first system can be maintained by an entity that is different from the first financial institution and the second financial institution. The acts additionally can include authorizing, at the first financial institution, a payment from the first account to the second account. The acts further can include sending, from the first financial institution to the first system, payment information regarding a deposit to be made in the second account from the first account. The payment information can be routed through the first system to the second financial institution such that the second financial institution, upon receiving the payment information, notifies the merchant to satisfy an expectation of the merchant for payment from the consumer. The payment information can include the transaction identifier, the account identifier of the second account, and the payment amount.

A number of embodiments include a method being implemented via one or more processing modules and one or more non-transitory memory storage modules storing computing instructions configured to run on the one or more processing modules. The method can include receiving, at a first financial institution from a mobile device of a consumer, a first request to pay a merchant for a payment amount from a first account of the consumer maintained by the first financial institution. The first request can include first information including a merchant identifier, a transaction identifier, and the payment amount. The first information can be sent to the first financial institution from a mobile application running on a mobile device used by the consumer at a store of the merchant to pay for one or more items to be purchased from the merchant by the consumer for the payment amount. The merchant identifier can be associated with the merchant. The mobile application can be associated with the first account. The method also can include determining, at the first financial institution, second information including an account identifier of a second account of the merchant maintained by a second financial institution, at least partially based on the merchant identifier and third information obtained from a first system. The first system can be in data communication with the first financial institution and the second financial institution. The first system can be maintained by an entity that is different from the first financial institution and the second financial institution. The method additionally can include authorizing, at the first financial institution, a payment from the first account to the second account. The method further can include sending, from the first financial institution to the first system, payment information regarding a deposit to be made in the second account from the first account. The payment information can be routed through the first system to the second financial institution such that the second financial institution, upon receiving the payment information, notifies the merchant to satisfy an expectation of the merchant for payment from the consumer. The payment information can include the transaction identifier, the account identifier of the second account, and the payment amount.

Additional embodiments include a system including one or more processing modules and one or more non-transitory memory storage modules storing computing instructions configured to run on the one or more processing modules and perform certain acts. The acts can include receiving, at a first system from a first entity, a request including a merchant identifier. The merchant identifier can be associated with a merchant. The first system can be in data communication with a first financial institution and a second financial institution. The first system can be maintained by an entity that is different from the first financial institution and the second financial institution. The first financial institution can maintain a first account of a consumer. The first system can be in data communication with a merchant account database. The acts also can include determining, at the first system, using the merchant account database, first information including an account identifier of a second account of the merchant maintained by a second financial institution. The account identifier can be associated with the merchant identifier in the merchant account database. The acts additionally can include sending the first information from the first system to the first financial institution. The acts further can include receiving, at the first system from the first financial institution, payment information regarding a deposit to be made in the second account from the first account to pay the merchant for one or more items to be purchased from the merchant by the consumer for the payment amount. The consumer can use a mobile device at a store of the merchant to pay for the one or more items. The mobile device can run a mobile application associated with the first account. The payment information can include a transaction identifier, the account identifier of the second account, and the payment amount. The acts additionally can include sending, from the first system to the second financial institution, the payment information such that the second financial institution, upon receiving the payment information, notifies the merchant to satisfy an expectation of the merchant for payment from the consumer.

Further embodiments include a method being implemented via one or more processing modules and one or more non-transitory memory storage modules storing computing instructions configured to run on the one or more processing modules. The method can include receiving, at a first system from a first entity, a request including a merchant identifier. The merchant identifier can be associated with a merchant. The first system can be in data communication with a first financial institution and a second financial institution. The first system can be maintained by an entity that is different from the first financial institution and the second financial institution. The first financial institution can maintain a first account of a consumer. The first system can be in data communication with a merchant account database. The method also can include determining, at the first system, using the merchant account database, first information including an account identifier of a second account of the merchant maintained by a second financial institution. The account identifier can be associated with the merchant identifier in the merchant account database. The method additionally can include sending the first information from the first system to the first financial institution. The method further can include receiving, at the first system from the first financial institution, payment information regarding a deposit to be made in the second account from the first account to pay the merchant for one or more items to be purchased from the merchant by the consumer for the payment amount. The consumer can use a mobile device at a store of the merchant to pay for the one or more items. The mobile device can run a mobile application associated with the first account. The payment information can include a transaction identifier, the account identifier of the second account, and the payment amount. The method additionally can include sending, from the first system to the second financial institution, the payment information such that the second financial institution, upon receiving the payment information, notifies the merchant to satisfy an expectation of the merchant for payment from the consumer.

Additional embodiments include a method being implemented via one or more processing modules and one or more non-transitory memory storage modules storing computing instructions configured to run on the one or more processing modules. The method can include performing, at a mobile device, a preliminary identity authentication of a consumer using the mobile device. The method also can include receiving at the mobile device first information from a point-of-sale terminal. The first information can include a merchant identifier, a transaction identifier, and a payment amount. The merchant identifier can uniquely correspond to the point-of-sale terminal at a store of a merchant. The mobile device can run a mobile application that is associated with a first account of the consumer using the mobile device. The first account of the consumer cam ne maintained by a first financial institution. The method further can include sending, from the mobile device to the first financial institution, a first request to pay the merchant for the payment amount from the first account for one or more items to be purchased from the merchant by the consumer. The first request can include the first information, such that the first financial institution, upon receiving the first request, determines second information including an account identifier of a second account of the merchant maintained by a second financial institution, at least partially based on the merchant identifier and third information obtained from a first system, and such that the first financial institution sends to the first system payment information regarding a deposit to be made in the second account from the first account. The payment information can be routed through the first system to the second financial institution such that the second financial institution, upon receiving the payment information, can notifies the merchant to satisfy an expectation of the merchant for payment from the consumer. The first system can be in data communication with the first financial institution and the second financial institution. The first system can be maintained by an entity that is different from the first financial institution and the second financial institution. The payment information can include the transaction identifier, the account identifier of the second account, and the payment amount. The payment information further can include one of: (a) a settlement credit push of funds for the payment amount from the first account to the second account, or (b) an irrevocable promise to pay the payment amount from the first account to the second account.

The method additionally can include, after sending the first request to pay the merchant and before the payment information is sent to the first system from the first financial institution: receiving, at the mobile device from the first financial institution, an additional authentication request to perform an additional identity authentication of the consumer using the mobile device; performing, at the mobile device, the additional identity authentication of the consumer using the mobile device; and sending, from the mobile device to the first financial institution, a response to the additional authentication request.

Performing the additional identity authentication of the consumer can include performing the additional authentication of the consumer based at least in part on at least one of: determining biometrics of the consumer using the mobile device; or requesting the consumer to enter additional information in the mobile device.

The method further can include prior to sending the first request to pay the merchant: sending, from the mobile device to the first financial institution, a preliminary request for account information; and receiving, at the mobile device from the first financial institution. The account information can include an account balance and an account status of the first account.

Further embodiments include a method being implemented via one or more processing modules and one or more non-transitory memory storage modules storing computing instructions configured to run on the one or more processing modules. The method can include determining, at a point-of-sale terminal at a store of a merchant, a payment amount for one or more items to be purchased from the merchant by a consumer. The method also can include sending first information from the point-of-sale terminal to a mobile device used by the consumer. The first information can include a merchant identifier, a transaction identifier, and the payment amount. The merchant identifier can uniquely correspond to the point-of-sale terminal at the store of the merchant. The mobile device can run a mobile application that is associated with a first account of the consumer using the mobile device. The first account of the consumer can be maintained by a first financial institution. The mobile device, upon receiving the first information, can send a first request to pay the merchant for the payment amount from the first account. The first request can include the first information, such that the first financial institution, upon receiving the first request, determines second information including an account identifier of a second account of the merchant maintained by a second financial institution, at least partially based on the merchant identifier and third information obtained from a first system, and such that the first financial institution sends to the first system payment information regarding a deposit to be made in the second account from the first account. The payment information can be routed through the first system to the second financial institution. The first system can be in data communication with the first financial institution and the second financial institution. The first system can be maintained by an entity that is different from the first financial institution and the second financial institution. The payment information can include the transaction identifier, the account identifier of the second account, and the payment amount. The payment information further can include one of: (a) a settlement credit push of funds for the payment amount from the first account to the second account, or (b) an irrevocable promise to pay the payment amount from the first account to the second account. The method further can include receiving, at the point-of-sale terminal from the second financial institution, a notification to satisfy an expectation of the merchant for payment from the consumer.

Sending the first information from the point-of-sale terminal to the mobile device can include sending the first information from the point-of-sale terminal to the mobile device using a proximity-based wireless data communication protocol.

The method additionally can include receiving, at the point-of-sale terminal from the mobile device, information about the consumer.

Still further embodiments include a method being implemented via one or more processing modules and one or more non-transitory memory storage modules storing computing instructions configured to run on the one or more processing modules. The method can include receiving, at a second financial institution from a first system, payment information regarding a deposit to be made in a second account of a merchant maintained by the second financial institution from a first account of a consumer maintained by a first financial institution to pay the merchant for one or more items to be purchased from the merchant by the consumer for the payment amount. The payment information can be sent from the first financial institution to the first system and routed through the first system to the second financial institution. The first system can be in data communication with the first financial institution and the second financial institution. The first system can be maintained by an entity that is different from the first financial institution and the second financial institution. The consumer can use a mobile device at a store of the merchant to pay for the one or more items. The mobile device can run a mobile application associated with the first account. The payment information can include a transaction identifier, an account identifier of the second account, and the payment amount. The first financial institution can determine the account identifier of the second account based on a merchant identifier and based on third information obtained from the first system. The merchant identifier can uniquely correspond to a point-of-sale terminal at the store of a merchant. The mobile device can send a request to pay the merchant for the payment amount from the first account. The request can include first information including the merchant identifier, a transaction identifier, and the payment amount. The payment information further can include one of: (a) a settlement credit push of funds for the payment amount from the first account to the second account, or (b) an irrevocable promise to pay the payment amount from the first account to the second account. The acts also can include sending, from the second financial institution to the point-of-sale terminal, a notification to satisfy an expectation of the merchant for payment from the consumer.

The method also can include, before sending the notification, crediting the second account with the payment amount.

Sending the notification to satisfy the expectation of the merchant for payment from the consumer can include notifying the merchant that funds for the payment amount are immediately available in the second account.

Turning to the drawings, FIG. 1 illustrates a block diagram of a system 100 that can be employed for a secure real-time payment transaction network, according to an embodiment. System 100 is merely exemplary and embodiments of the system are not limited to the embodiments presented herein. The system can be employed in many different embodiments or examples not specifically depicted or described herein. In some embodiments, certain elements or modules of system 100 can perform various procedures, processes, and/or activities. In other embodiments, the procedures, processes, and/or activities can be performed by other suitable elements or modules of system 100.

Figure 7:
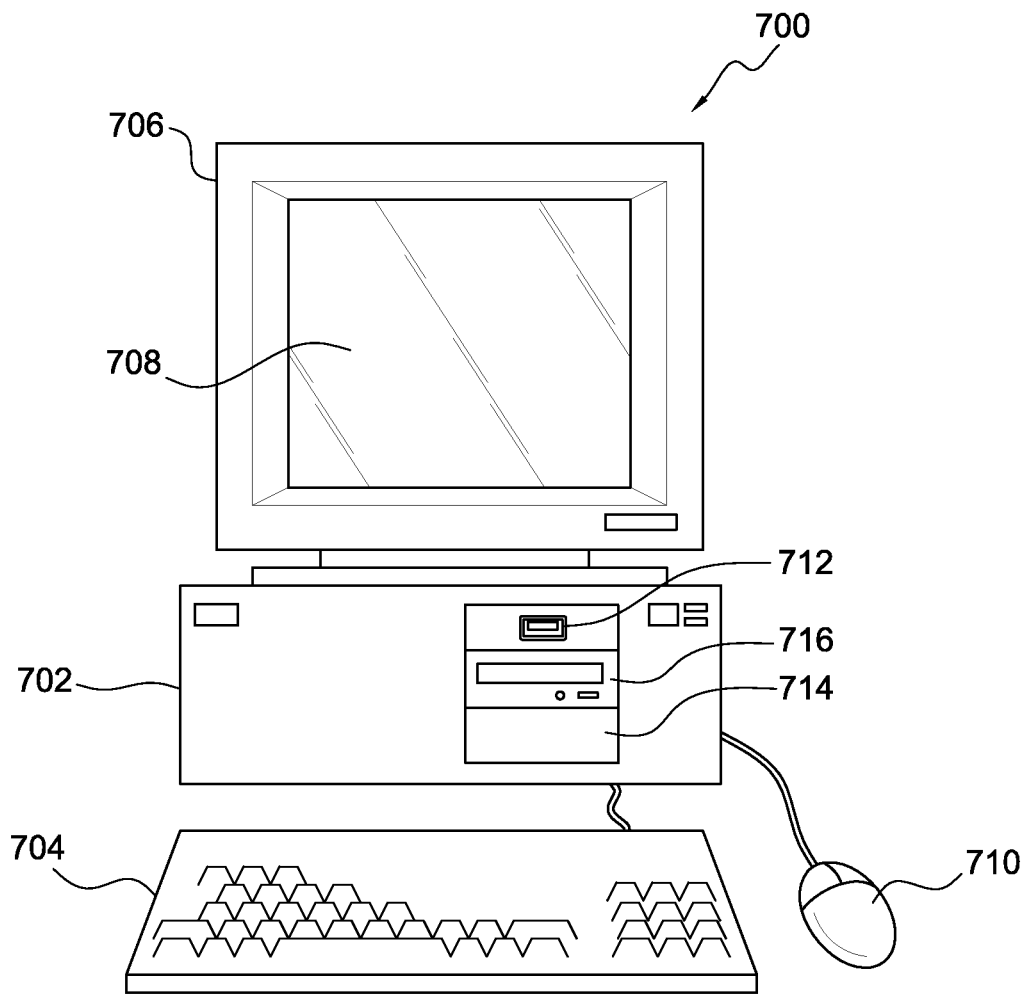
FIG. 7 illustrates a computer that is suitable for implementing an embodiment of components of the system of FIG. 1.

In some embodiments, system 100 can include one or more point-of-sale terminals, such as point-of-sale terminal 110; one or more mobile devices, such as mobile device 120; two or more financial institutions, such as financial institutions 130 and 150; and/or a transaction system 140. In other embodiments, system 100 also can include a wallet provider 160. In a number of embodiments, each of the point of sale terminals, the one or more mobile devices, the two or more financial institution, and the transaction system can be or include a computer system, such as computer system 700, as shown in FIG. 7 and described below, and can be a single computer, a single server, or a cluster or collection of computers or servers, or a cloud of computers or servers. In many embodiments, various components (e.g., 110, 120, 130, 140, 150, 160) of system 100 can be in data communication with various other components (e.g., 110, 120, 130, 140, 150, 160) of system 100, such as through one or more networks. The networks can be the Internet and/or other suitable data communication networks.

In various embodiments, point-of-sale terminal 110 can be located within a store of a merchant, such as merchant 115. In several embodiments, the store can be a place of business, which can offer and/or sell items, such as products and/or services. In a number of embodiments, point-of-sale terminal 110 can be used to checkout a consumer 125 using mobile device 120 for one or more items to be purchased by consumer 125. In many embodiments, point-of-sale terminal 110 can include one or more modules, such as checkout module 111, communication modules 112, payment module 113, consumer information module 114, and/or other suitable modules, as described below in further detail. For example, in various embodiments, checkout module 111 can be used to determine the payment amount, communication module 112 can communicate with other components of system 100, payment module 113 can determine whether consumer 125 has satisfactorily paid for the one or more items to be purchased, and/or consumer information module 114 can store information regarding consumer 125.

In a number of embodiments, mobile device 120 can be used by consumer 125 to initiate a payment to merchant 115 for the one or more items to be purchased. In various embodiments, mobile device 120 can run a mobile application 123, such as a mobile wallet, which can be employed to facilitate paying merchant 115. In a number of embodiments, mobile device 120 and/or mobile application 123 can include one or more modules, such as authentication module 121, account module 122, communication module 124, and/or other suitable modules, as described below in further detail. For example, in various embodiments, authentication module 121 can verify the identity of consumer 125, account module 122 can provide information regarding a consumer account of consumer 125, and/or communication module 124 can communicate with other components of system 100.

In several embodiments, when consumer 125 using mobile device 120 is at point-of-sale terminal 110 to checkout, point-of-sale terminal 110 can determine the payment amount for the one or more items, and can communicate information to mobile device 120, such as the payment amount, a merchant identifier, and/or a transaction identifier.

In some embodiments, the merchant identifier can uniquely identify point-of-sale terminal 110. For example, each point-of-sale terminal can have a unique merchant identifier. In a number of embodiments, the merchant identifier can uniquely identify the merchant (e.g., merchant 115). For example, each merchant (e.g., merchant 115) can have a unique merchant identifier. In some embodiments, the merchant identifier can be a token that can be associated with merchant 115 and/or point of sale terminal 110. In many embodiments, when merchant 115 sets up, configures, and/or reconfigures, point-of-sale terminal 110, the merchant identifier can be created and/or assigned to point-of-sale terminal 110. In the same or different embodiments, one part of the merchant identifier can uniquely identify merchant 115, and another part of the merchant identifier can uniquely identify point-of-sale terminal 110, such that the part of the merchant identifier that uniquely identifies merchant 115 is the same for all point-of-sale terminals owned or used by merchant 115.

In various embodiments, mobile device 120 and point-of-sale terminal 110 can communicate with each other (either one-way or two-way) using a wireless data communication protocol. In some examples, the communication protocol can allow for one-way or two-way communication. For example, the wireless data communication protocol can be a proximity-based wireless data communication protocol, such as Near Field Communication (NFC), Bluetooth, Bluetooth Low Energy (BLE), iBeacon, etc. In other embodiments, mobile device 120 and/or point-of-sale terminal 110 can communicate with each other using another suitable form of communication. For example, in some embodiments, point-of-sale terminal 110 can provide a barcode (such as a QR code), which can be scanned using a camera of mobile device 120, and/or mobile device 120 can provide a barcode (such as a QR code), which can be scanned using an optical scanner of point-of-sale terminal 110. In a number of embodiments, communication module 112 can provide communication functionality for point-of-sale terminal 110, and/or communication module 124 can provide communication functionality for mobile device 120.

In several embodiments, transaction system 140 can be in data communication with financial institutions, such as financial institution 130 and/or financial institution 150, and can provide for interaction, facilitate communications, and/or facilitate transactions between the financial institutions, such as financial institutions 130 and 150. In a number of embodiments, transaction system 140 can include one or more modules, such as a communication module 143, an account module 144, a transaction module 145, and/or other suitable modules. In some embodiments, communication module can be used to provide communications with the financial institutions (e.g., 130, 150). In many embodiments, transaction system 140 can include a merchant account database 141 and/or a transaction database 142, as described below in further detail. In some embodiments, account module 144 can interface with merchant account database 141, and/or transaction module 145 can interface with transaction database 142.

In a number of embodiments, the financial institutions (e.g., 130, 150) can be depository financial institutions, such as savings banks, credit unions, savings and loan associations, card issuing financial institutions, or other forms of financial institutions. In a number of embodiments, financial institution 130 can be include a consumer account 131 associated with consumer 125. In various embodiments, consumer account 131 can be a deposit account, such as a checking account or savings account, or a lending account, such as a charge account or credit account. In some embodiments, financial institution 130 can include one or more modules, such as communication module 132, authorization module 133, account module 134, and/or other suitable modules, as described below in further detail. For example, in some embodiments, account module 134 can interface with consumer account 134 to provide information regarding the status of consumer account 131, and/or can store and/or determine information regarding other accounts. In a number of embodiments, communication module 132 can communicate with other components of system 100. In various embodiments, authorization module 133 can authorize payments from consumer account 131.

In a number of embodiments, financial institution 150 can be include a merchant account 151 associated with merchant 115. In various embodiments, merchant account 115 can be a deposit account, such as a merchant account. In some embodiments, financial institution 135 can include one or more modules, such as communication module 152, account module 153, and/or other suitable modules, as described below in further detail. For example, in some embodiments, account module 153 can interface with merchant account 151 to provide information regarding the status of merchant account 151, and/or can store and determine information regarding other accounts. In a number of embodiments, communication module 152 can communicate with other components of system 100.

In several embodiments, merchant account database 141 of transaction system 140 can store information regarding merchants (e.g., merchant 115) and merchant accounts. For example, in a number of embodiments, merchant account database 141 can store a mapping between merchant identifiers and merchant accounts. For example, a certain merchant identifier can be associated with merchant 115 and merchant account 151 of merchant 115 maintained by financial institution 150. When provided with the merchant identifier, account module 144 and merchant account database 141 can be used by transaction system 140 to determine an account identifier (e.g., an account number) of merchant account 151, the name of merchant 115, a location of merchant 115, a location of point-of-sale terminal 110, and/or other information regarding merchant 115 and/or the merchant account. For example, in some embodiments, transaction system 140 can provide risk information (e.g., a risk score) regarding merchant 115 and/or merchant account 151. As an example, a merchant can have three point-of-sale terminals, such as point-of-sale terminal 110, each with a unique identifier, which can each be associated with a single account of merchant 115, specifically, merchant account 151.

In many embodiments, system 100 can provide a transaction network for secure real-time payments. In several embodiments, mobile application 123 of mobile device 120 can be used by consumer 125 to push a payment from consumer account 131 to merchant account 151 to satisfy an expectation of payment while consumer 125 is waiting at point-of-sale terminal 110. In a number of embodiments, mobile application 123 can be associated with and/or configured to be associated with financial institution 130 and/or consumer account 131. For example, account module 122 can associate mobile application 123 with consumer account 131 at financial institution 130. In some embodiments, mobile application 123 can be provided by financial institution 130 as a mobile application for use on mobile device 120. In other embodiments, mobile application 123 can be associated with multiple different financial institutions and accounts of consumer 125 at those financial institutions. In some embodiments, mobile device 120 can be in data communication with financial institution 130 directly through a network, such as the Internet, or indirectly through one or more other systems, such as mobile wallet provider 160. In some embodiments, mobile device 120 can communicate with transaction system 140 directly through a network or through mobile wallet provider 160. In other embodiments, mobile device 120 cannot communicate with transaction system 140.

In several embodiments, mobile application 123 can provide information to consumer 125 regarding the status of consumer account 131 and availability of funds in consumer account 131. For example, account module 122 of mobile device 120 can obtain information from account module 134 of financial institution 130 regarding consumer account 131 and provide that information to consumer 125. For example, if consumer account has an available balance and/or available credit of $500, mobile application 123 can communicate the available funds for consumer account 131 to consumer 125, which can allow consumer 125 to know the available funds for spending before shopping for items and/or before attempting to purchase items. In a number of embodiments, account module 134 can provide account module 122 with various other information, such as the current status of account 131, such as whether consumer account 131 is open and in good status (or closed), whether consumer account 131 has had recent not sufficient funds (NSF) activity, whether consumer account 131 has a stop payment order, and/or a buying power index of consumer 125 at least partially based on information about consumer account 131.

In some embodiments, mobile application 123 can be used on mobile device 120 at point-of-sale terminal 110 to conduct a transaction. In several embodiments, mobile device 120 can receive the merchant identifier and other transaction information from point-of-sale terminal 110 of merchant 115. The merchant identifier can be associated with merchant account 151 of merchant 115. By receiving the merchant identifier, mobile application 123 can initiate a push payment from consumer account 131 at financial institution 130 to merchant account 151 at financial institution 150 to complete the transaction in real-time before the consumer leaves the store of merchant 115.

In various embodiments, authentication module 121 can verify the identity of consumer 125. For example, authentication module 121 can verify the identity of consumer 125 using a personal identification number (PIN), a password, one or more fingerprints, voice recognition, other biometrics (e.g., mobile phone bio-measurements), and/or other suitable authentication methods, to ensure that consumer 125 is authorized to associate mobile application 123 with consumer account 131 and/or make payments using mobile application 123.

In a number of embodiments, when mobile application 123 is used to conduct a transaction, mobile device 120 can be put in the proximity of point-of-sale terminal 110 to allow communication module 124 to receive information from point-of-sale terminal 110, such as the payment amount, the merchant identifier, a transaction identifier, and/or other information, such as the merchant name, the date and time, the one or more items to be purchased, etc. In some embodiments, mobile application 123 can be configured to allow one-click checkout, which can be enabled by selecting a button on mobile application 123 or by placing mobile device 120 in the proximity of a data transmitter on point-of-sale terminal 110. In some embodiments, mobile application 123 can be configured to scan items and conduct transactions in real-time as items are taken from the shelf and scanned by mobile device 120 or placed within a "smart" shopping cart, such that checkout can take place in an aisle of the store, rather than at point-of-sale terminal 110. In other embodiments, checkout can take place automatically when consumer 125 exits the store of merchant 115. In a number of embodiments, mobile application 123 can receive the merchant identifier upon entering the store of merchant 115 or from a shopping cart having data transmitted in the store of merchant 115.

In some embodiments, the mobile application 123 can send information from mobile device 120 to point-of-sale terminal 110, such as information regarding consumer 125, such as personally identifiable information, loyalty rewards number(s), shopping patterns, points, buying power index, and/or other suitable information. In several embodiments, consumer information module 114 can process the information provided from mobile application 123 to provide information to merchant 115 regarding consumer 125. In some embodiments, mobile device 120 can communicate information, such as a buying power index, to point-of-sale terminal 110 and/or merchant 115 upon entering the store of merchant 115.

In many embodiments, after mobile device 120 has communicated with point-of-sale terminal 110 using communication module 124 to receive the merchant identifier and other transaction information, mobile device 120 can communicate with financial institution 130 and/or transaction system 140, either directly or through mobile wallet provider 160, to request a payment be made to merchant account 151 of merchant 115 from consumer account 131. For example, when mobile device 120 communicates with financial institution 130 (either directly or through mobile wallet provider 160) to request a payment be made, account module 134 of financial institution 130 can determine account information about merchant account 151, such as the account identifier of merchant account 151, at least partially based on the merchant identifier received from mobile device 130. In some embodiments, financial institution 130 can communicate with transaction system 140 to get the account information about merchant account 151, which can be stored in merchant account database 141. In some embodiments, financial institution 130 can save the account information about merchant account 151 so financial institution does not need to query the account information from merchant account database 141 in transaction system 140 for future transaction involving the same merchant identifier. In other embodiments, financial institution 130 can query for the account information from merchant account database 141 in transaction system 140 for each new transaction, or at occasional and/or regular intervals. In other embodiments, when mobile device 120 communicates with transaction system 140 (either directly or through mobile wallet provider 160) to request a payment be made, transaction system 140 can provide the account information about merchant account 151 to first financial institution 130.

In many embodiments, having the account information about merchant account 151, financial institution 130 can initiate a payment to financial institution 150 from consumer account 131 to merchant account 151. In several embodiments, before initiating payment, authorization module 133 can determine whether to authorize payment from consumer account 131. For example, financial institution 131 can determine whether the payment amount is within the available funds in consumer account 131, determine whether consumer account 131 is currently open and in good status (or closed), authenticate the identity of consumer 125 using mobile device 120, and/or perform other actions. For example, in some embodiments, authentication module 121 can authenticate the identity of consumer 125, and that information can be communicated from mobile device 120 to financial institution 130. In some embodiments, mobile device 120 can prompt consumer 125 to authenticate before and/or after mobile device 120 receives the merchant identifier and/or the transaction information from point-of-sale terminal 110.

In some embodiments, authorization module 133 can request additional authentication from authentication module 121 (which can be directly through a network between financial institution 130 and mobile wallet 120, or can be through mobile wallet provider 160 and/or through transaction system 140) after receiving the request for payment from mobile device 120 and/or after receiving the information about merchant 115 and/or merchant account 151. In a number of embodiments, authorization module 133 of financial institution 130 can perform different and/or varying levels of authentication based on various factors. For example, authentication module 121 and/or authorization module 133 can determine whether mobile device 120 used to send the request for payment has been previously used by consumer 125 for transaction with financial institution 130, whether biometrics of the consumer match stored biometrics of consumer 125, whether the requested transaction and associated details (e.g., the identity of merchant 115, the location of merchant 115, the payment amount, the one or more items to be purchased, and/or other suitable factors) are consistent with spending patterns of consumer 125, whether consumer 125 has reported mobile device 120 lost or stolen, whether consumer 125 has reported that credit cards, debit cards, or other information about consumer account 131 have been lost or stolen, and/or other suitable factors. In various embodiments, financial institution 130 can adjust the level of authentication used to verify the identity of consumer 125 based on one or more of these factors, and/or based on the payment amount, the identity of merchant 115, the location of merchant 115, historical spending of consumer 125, and/or other relevant information.

In many embodiments, after receiving authorization from authorization module 133, financial institution 130 can initiate a payment to financial institution 150 to transfer funds from consumer account 131 to merchant account 151. In a number of embodiments, the payment can be effected by sending payment information regarding a deposit to be made in merchant account 151 from consumer account 131. In a number of embodiments, the payment information transferred from financial institution 130 to financial institution 150 can effectuate an authenticated credit push, which can irrevocably satisfy payment to the merchant and/or ensure that the merchant has good funds when consumer 125 leaves the store of merchant 115. For example, the payment can be a settlement credit push of funds for the payment amount from consumer account 131 to merchant account 151, which can be settled immediately. In various embodiments, the payment information transferred from financial institution 130 to financial institution 150 can effectuate a push promise to pay, which can provide an irrevocable guarantee of payment from financial institution 130 to financial institution 150. In several embodiments, for example, the payment can be an ACH (Automated Clearing House) credit push, which can provide an irrevocable funding guarantee.

In many embodiments, the payment and/or the guarantee of payment can be sent in real-time from financial institution 130 to financial institution 150, which can happen for each such transaction. In some embodiments, the settlement of the transaction can happen later, such as in a nightly batch fashion, and in some embodiments, can happen through a different network, such as an ACH network or a credit network. In other embodiments, the real-time payment and/or guarantee of payment can be processed through an ACH network or a credit network. In some embodiments, the consumer can provide instructions to financial institution 130 to label the transaction as a debit or a credit transaction in consumer account 131, and in some embodiments can provide such instructions with the request to pay, or before or after the request to pay. In some embodiments, a credit transaction can be treated as a micro-loan. In certain embodiments, a debit pull with guaranteed promise to pay can be used, such that financial institution 150 can receive a guaranteed promise to pay from financial institution 130 and pull the funds using a debit pull.

In various embodiments, transaction system 140 can store information regarding each transaction in transaction database 142. In several embodiments, transaction system 140 can serve as a central auditor for transactions between the financial institutions (e.g., 130, 150) in data communication with transaction system 142.

In a number of embodiments, financial institution 150, upon receiving payment and/or guarantee of payment, can notify point-of-sale terminal 110 and/or merchant 115 in real-time that merchant 115 has satisfactorily received payment from consumer 125. For example, the notification can include various information, such as the transaction identifier, the amount received in payment (or guarantee), the merchant identifier, and/or other information. Receiving the notice of good funds can allow merchant 115 to proceed, such as, for example, to allow consumer to leave the store of merchant 115 with the items. In some embodiments, for example, point-of-sale terminal 110 can match the notification to the pending transaction in point-of-sale terminal 110 using the transaction identifier. In certain embodiments, merchant 115 can match the notification to the point-of-sale terminal using the merchant identifier. In some embodiments, consumer 125 can receive a notification on mobile device 120 that the transaction has cleared.

In several embodiments, system 100 can beneficially allow consumer 125 to send payment directly and/or immediately to merchant 115 when consumer 125 is checking out at point-of-sale terminal 110. In many embodiments, the payment systems and methods provided by system 100 described herein can eliminate the acquirer model that is conventionally used in payment card transactions. In several embodiments, the payment systems and methods provided by system 100 described herein can advantageously streamline payments by eliminating the need for the financial institution (i.e., the acquirer) of merchant 115 to request payment from the financial institution (i.e., the issuer) of consumer 125. For example, in many embodiments, financial institution 150 does not need to request payment from financial institution 130. In many embodiments, the payment systems and methods provided by system 100 described herein can beneficially ensure merchants (e.g., merchant 115) are paid by consumers (e.g., consumer 125) while eliminating and/or reducing many of the transaction fees paid to various entities in the conventional model.

In a number of embodiments, the payment systems and methods provided by system 100 described herein can advantageously eliminate the chargeback liability of merchants for fraudulent transactions. In the conventional acquirer-issuer model, the merchant (e.g., 115) is responsible for verifying the credit or debit card to ensure that the card is not being used fraudulently. In several embodiments, the payment systems and methods provided by system 100 described herein can beneficially place the liability on the financial institution (e.g., 130) of the consumer (e.g. 125), which can be in a better position (e.g., with more and/or better information) than the merchant (e.g., 115) to determine if the request to pay is a legitimate, authentic transaction requested by the consumer (e.g., 125) and/or if the consumer's account is still open and in good status (or closed), has sufficient funds, etc. In various embodiments, the payment systems and methods provided by system 100 described herein can advantageously allow the financial institution (e.g., 130) of the consumer (e.g., 125) to choose how to authenticate the consumer (e.g., 125), and/or can beneficially allow the financial institution (e.g., 130) of the consumer (e.g., 125) to choose the level of authentication, which can be tailored for each consumer (e.g., 125) and/or for each transaction (e.g., the financial institution (e.g., 130) can decide, at least partially based on its risk determination, that a transaction with a higher payment amount warrants a higher level of authentication). In several embodiments, the liability for fraudulent use of the consumer account (e.g., 131) can be placed on the consumer (e.g., 125), and/or the consumer (e.g., 125) can choose the level of authentication used by the financial institution (e.g., 130) of the consumer (e.g., 125). In many embodiments, unauthorized access to consumer account 131 can beneficially be reduced and/or eliminated using the payment method provided by system 100 and described herein.

In several embodiments, the payment systems and methods provided by system 100 described herein can beneficially provide the ability for financial institution 130 to communicate directly with consumer 125 at point-of-sale 110 when making a transaction. In many embodiments, the payment systems and methods provided by system 100 described herein can provide information to consumer 125, such as account balance, insufficient funds, lock/freeze on consumer account 131, etc., in real-time before consumer 125 requests payments, which can advantageously eliminate and/or reduce negative experiences of consumer 125, such as attempting to transact with insufficient funds or a freeze on consumer account 131.

In several embodiments, account information about consumer account 131 can beneficially be better protected from theft by the payment systems and methods provided by system 100 described herein, because, in a number of embodiments, the account information of consumer account 131 and/or personally identifiable information of consumer 125 can be undisclosed to third parties other than financial institution 130, which maintains consumer account 131. For example, in some embodiments, the account information of consumer account 131 and/or personally identifiable information of consumer 125 can be undisclosed to point-of-sale terminal 110, merchant 115, transaction system 140, and/or financial institution 150. In many embodiments, the account identifier (e.g., account number) of consumer account 131 is not sent across any networks, but resides solely in financial institution 130, which can beneficially prevent that information from being stolen. For example, the many recent large-scale data breaches of merchant systems that have exposed consumer account information and personally identifiable information of millions of consumers could have been mitigated by using the payment systems and methods provided by system 100 and described herein.

In other embodiments, consumer 125 can choose to provide account information of consumer account 131 and/or personally identifiable information of consumer 125 to one or more third parties. For example, in some embodiments consumer 125 can set privacy instructions in mobile device 120 and/or with financial institution 130 regarding what information can be disclosed to third parties. For example, consumer 125 can elect to disclose certain information to merchant 115 in order to receive discounts, point, and/or other perks from merchant 115. For example, in some embodiments, financial institution 130 can send certain personally identifiable information of consumer 125 through transaction system 140 to financial institution 150 along with the payment information, and financial institution 150 can provide the information to merchant 115. In the same or other embodiments, mobile device 120 can provide certain personally identifiable information of consumer 125 to merchant 115, such as through the wireless data communication protocol. Examples of such personally identifiably information can include a name, a home address, a telephone number, a social security number, a tax identification number, an age, an income level, marital status, a number of dependents, a frequent shopper identifier, shopping preferences, etc.

In various embodiments, the payment systems and methods provided by system 100 described herein also can beneficially shield the account information about merchant account 151 from being disclosed outside a network of financial institutions (e.g., 130, 150) and transaction system 140, which can beneficially prevent theft and misuse of the account information about merchant account 151.

Figure 2:
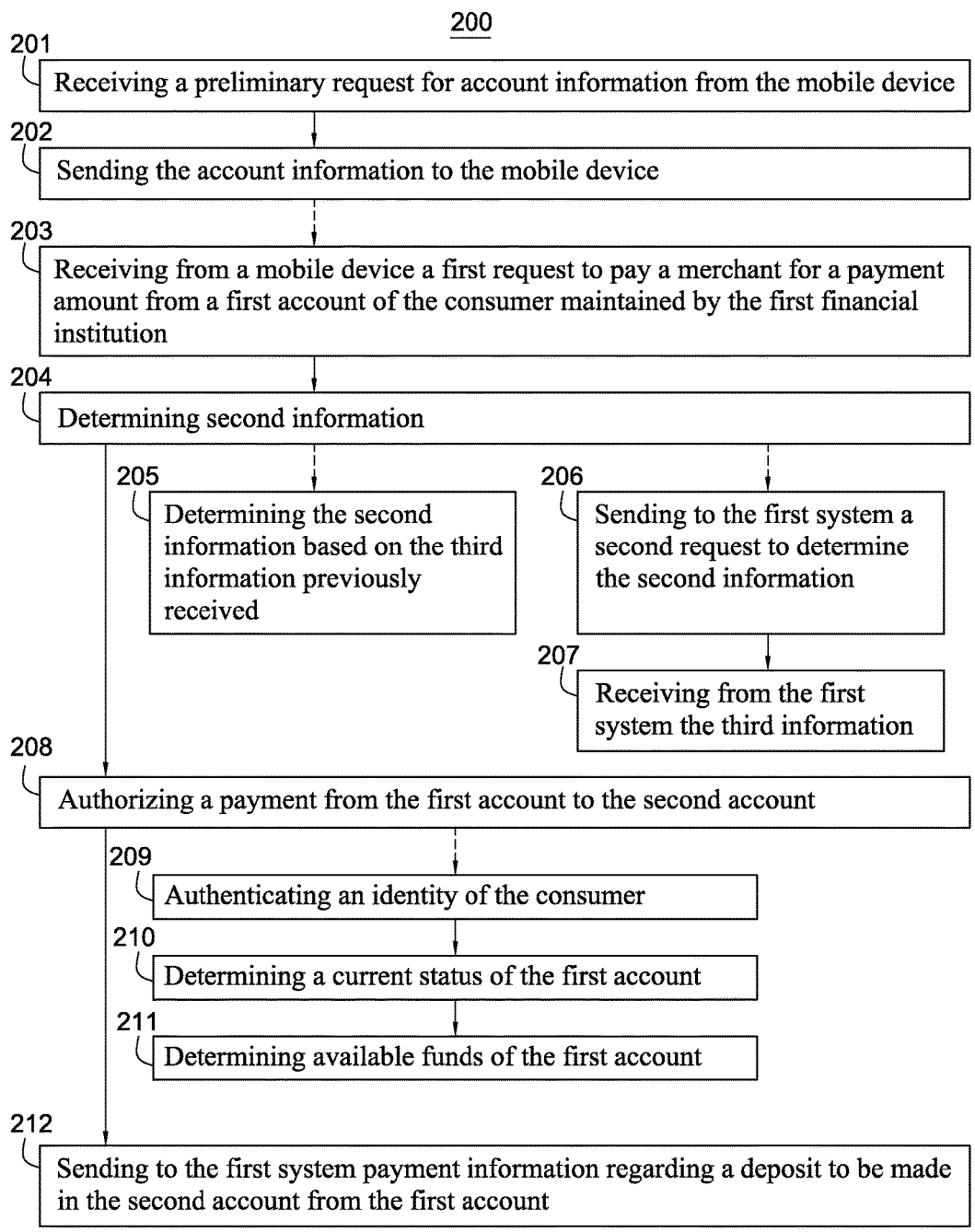
FIG. 2 illustrates a flow chart for a method 200, according to an embodiment.

Turning ahead in the drawings, FIG. 2 illustrates a flow chart for a method 200, according to an embodiment. In some embodiments, method 200 can be a method of facilitating secure payment transactions. Method 200 is merely exemplary and is not limited to the embodiments presented herein. Method 200 can be employed in many different embodiments or examples not specifically depicted or described herein. In some embodiments, the procedures, the processes, and/or the activities of method 200 can be performed in the order presented. In other embodiments, the procedures, the processes, and/or the activities of method 200 can be performed in any suitable order. In still other embodiments, one or more of the procedures, the processes, and/or the activities of method 200 can be combined or skipped. In some embodiments, method 200 can be performed by financial institution 130 (FIG. 1).

Referring to FIG. 2, in some embodiments, method 200 can optionally include one or more preliminary blocks, such as a block 201 and a block 202, described below. Specifically, method 200 can include block 201 of receiving, at a first financial institution from a mobile device, a preliminary request for account information. The first financial institution can be similar or identical to financial institution 130 (FIG. 1). The mobile device can be similar or identical to mobile device 120 (FIG. 1).

In several embodiments, method 200 additionally can include block 202 of sending, from the first financial institution to the mobile device, the account information. In some embodiments, the account include can include an account balance and an account status of a first account. The first account can be similar or identical to consumer account 131 (FIG. 1).

In a number of embodiments, method 200 further can include a block 203 of receiving, at a first financial institution from a mobile device of a consumer, a first request to pay a merchant for a payment amount from a first account of the consumer maintained by the first financial institution. The consumer can be similar or identical to consumer 125 (FIG. 1). The merchant can be similar or identical to merchant 115 (FIG. 1). In many embodiments, the first request can include first information, which can include a merchant identifier, a transaction identifier, and/or the payment amount. In several embodiments, the first information can be sent to the first financial institution from a mobile application running on a mobile device used by the consumer at a store of the merchant to pay for one or more items to be purchased from the merchant by the consumer for the payment amount. The mobile application can be similar or identical to mobile application 123 (FIG. 1). In some embodiments, the one or more items to be purchased can include at least one of one or more products or one or more services. In many embodiments, the merchant identifier can be associated with the merchant. In a number of embodiments, the mobile application can be associated with the first account. In some embodiments, the merchant identifier can uniquely correspond to a point-of-sale terminal at the store of the merchant. In various embodiments, the merchant identifier can be obtained by the mobile device from the point-of-sale terminal using a proximity-based wireless data communication protocol.

In many embodiments, method 200 additionally can include a block 204 of determining, at the first financial institution, second information. In many embodiments, the second information can include an account identifier of a second account of the merchant maintained by a second financial institution, at least partially based on the merchant identifier and third information obtained from a first system. The second account can be similar or identical to merchant account 151 (FIG. 1). The second financial institution can be similar or identical to financial institution 150 (FIG. 1). The first system can be similar or identical to transaction system 140 (FIG. 1). In a number of embodiments, the account identifier can be or include an account number. In some embodiments, the first system can be in data communication with the first financial institution and the second financial institution. In many embodiments, the first system can be maintained by an entity that is different from the first financial institution and the second financial institution. In some embodiments, the second information further can include a name of the merchant and/or a location of the store of the merchant.

In some embodiments, block 204 of determining second information can include a block 205 of determining, at the first financial institution, the second information at least partially based on the merchant identifier and the third information. In a number of embodiments, the third information can be received by the first financial institution from the first system prior to receiving the first request to pay the merchant from the mobile device. For example, the third information can be stored at the first financial institution from a previous query to the first system. In many embodiments, the third information can include the account identifier of the second account. In some embodiments, the second information can include the third information.

In other embodiments, block 204 of determining second information can include a block 206 and a block 207, described below. For example, block 204 can include block 206 of sending, from the first financial institution to the first system, a second request to determine the second information. In several embodiments, the second request can include the merchant identifier.

In these same other embodiments, block 204 can include block 207 of receiving, at the first financial institution from the first system, the third information. The third information can include the account identifier of the second account. In many embodiments, the second information can include the third information.

In some embodiments, method 200 can continue with a block 208 of authorizing, at the first financial institution, a payment from the first account to the second account.

In a number of embodiments, block 208 of authorizing the payment from the first account to the second account can include a block 209 of authenticating an identity of the consumer that used the mobile device to send the first request to pay the merchant from the first account. In some embodiments, block 209 of authenticating the identity of the consumer can include authenticating the identity of the consumer based at least in part on whether the mobile device used to send the first request has previously been used by the consumer in transaction involving the first financial institution, whether biometrics of the consumer using the mobile device match stored biometrics of the consumer, and/or whether at least one of an identity of the merchant, a location of the merchant, or the payment amount is consistent with historical patterns of behavior by the consumer.

In a number of embodiments, the first information further can include the one or more items to be purchased, and block 209 of authenticating the identity of the consumer further can include authenticating the identity of the consumer based at least in part on the one or more items to be purchased by the consumer for the payment amount from the merchant.

In a number of embodiments, block 209 of authenticating the identity of the consumer further can include adjusting a level of authentication at least partially based on the payment amount to be paid to the merchant, whether the mobile device used to send the first request has previously been used by the consumer in transaction involving the first financial institution, whether biometrics of the consumer using the mobile device match stored biometrics of the consumer, and/or whether at least one of an identity of the merchant, a location of the merchant, the payment amount, or the one or more items to be purchased is consistent with historical patterns of behavior by the consumer.

In many embodiments, block 208 of authorizing payment from the first account to the second account additionally can include a block 210 of determining a current status of the first account. For example, the first financial institution can determine whether the first account is open and in good status, or has a freeze or hold status.

In several embodiments, block 208 of authorizing payment from the first account to the second account additionally can include a block 211 of determining available funds of the first account. For example, the first financial institution can use the determination of the available funds of the first account to determine whether the payment amount can be covered by the available funds of the first account.

In a number of embodiments, method 200 can continue with a block 212 of sending, from the first financial institution to the first system, payment information regarding a deposit to be made in the second account from the first account. In several embodiments, the payment information can be routed through the first system to the second financial institution such that the second financial institution, upon receiving the payment information, can notify the merchant in order to satisfy an expectation of the merchant for payment from the consumer. In some embodiments, the payment information can include the transaction identifier, the account identifier of the second account, and/or the payment amount. In a number of embodiments, the payment information can include the merchant identifier.

In some embodiments, the payment information further can include a settlement credit push of funds for the payment amount from the first account to the second account. In other embodiments, the payment information further can include an irrevocable promise to pay the payment amount from the first account to the second account. In several embodiments, the payment information further can include a set of personally identifiable information of the consumer. In a number of embodiments, the set of personally identifiable information can be at least partially based on privacy instructions sent by the consumer to the first financial institution.

Figure 3:
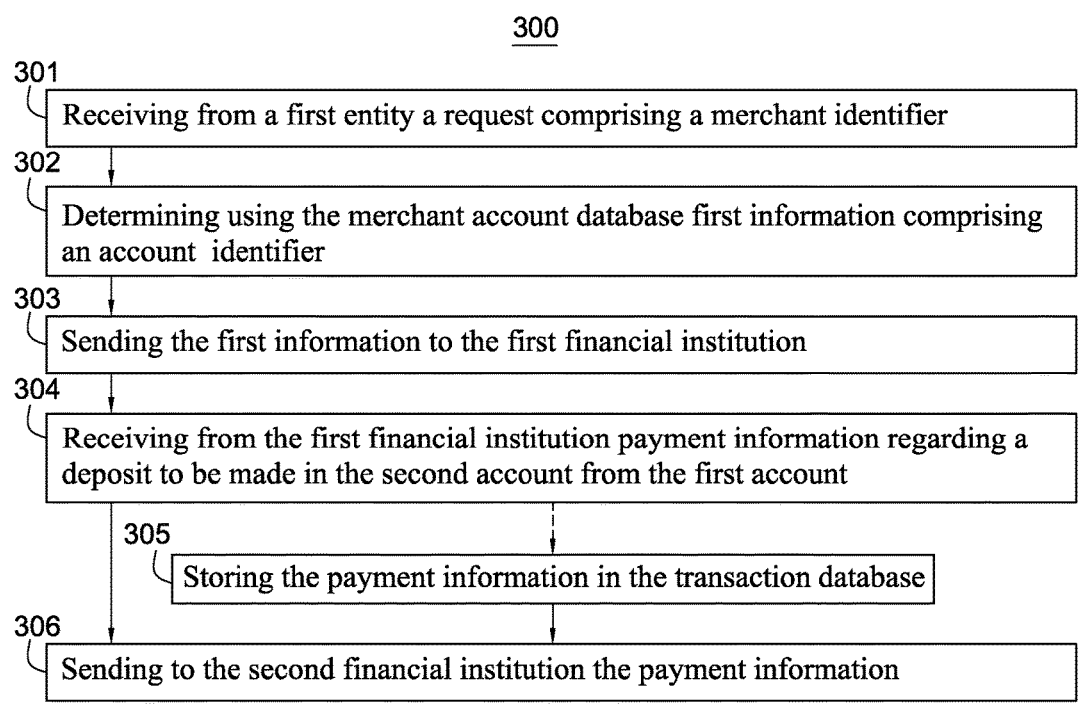
FIG. 3 illustrates a flow chart for a method 300, according to an embodiment.

Turning ahead in the drawings, FIG. 3 illustrates a flow chart for a method 300, according to an embodiment. In some embodiments, method 300 can be a method of facilitating secure payment transactions. Method 300 is merely exemplary and is not limited to the embodiments presented herein. Method 300 can be employed in many different embodiments or examples not specifically depicted or described herein. In some embodiments, the procedures, the processes, and/or the activities of method 300 can be performed in the order presented. In other embodiments, the procedures, the processes, and/or the activities of method 300 can be performed in any suitable order. In still other embodiments, one or more of the procedures, the processes, and/or the activities of method 300 can be combined or skipped. In some embodiments, method 300 can be performed by transaction system 140 (FIG. 1).

Referring to FIG. 3, method 300 can include a block 301 of receiving, at a first system from a first entity, a request. The first system can be similar or identical to transaction system 140 (FIG. 1). In some embodiments, the first entity can be a first financial institution. The first financial institution can be similar or identical to financial institution 130 (FIG. 1). In other embodiments, the first entity can be a mobile device being used a consumer. In yet other embodiments, the first entity can be a mobile wallet provider in data communication with the mobile device being used by the consumer. In a number of embodiments, the request can include a merchant identifier. In several embodiments, the merchant identifier can be associated with a merchant. The merchant can be similar or identical to merchant 115 (FIG. 1). In many embodiments, the first system can be in data communication with the first financial institution and a second financial institution. The second financial institution can be similar or identical to financial institution 150 (FIG. 1). In various embodiments, the first system can be maintained by an entity that is different from the first financial institution and the second financial institution. In some embodiments, the first financial institution can maintain a first account of a consumer. The first account can be similar or identical to consumer account 131 (FIG. 1). The consumer can be similar or identical to consumer 125 (FIG. 1). In many embodiments, the first system can be in data communication with a merchant account database. The merchant account database can be similar or identical to merchant account database 141 (FIG. 1). In a number of embodiments, the first system can include the merchant account database In some embodiments, the first system can include a transaction database. The transaction database can be similar or identical to transaction database 142 (FIG. 1). In a number of embodiments, the merchant identifier can uniquely correspond to a point-of-sale terminal at the store of the merchant. In various embodiments, the merchant identifier can be obtained by the mobile device from the point-of-sale terminal using a proximity-based wireless data communication protocol.

In many embodiments, method 300 additionally can include a block 302 of determining, at the first system, using the merchant account database, first information. In several embodiments, the first information can include an account identifier of a second account of the merchant maintained by a second financial institution. The second account can be similar or identical to merchant account 151 (FIG. 1). The second financial institution can be similar or identical to financial institution 150 (FIG. 1). In some embodiments, the account identifier can be associated with the merchant identifier in the merchant account database. In a number of embodiments, the first information further can include a name of the merchant and/or a location of a store of the merchant.

In many embodiments, method 300 further can include a block 303 of sending the first information from the first system to the first financial institution.

In several embodiments, method 300 additionally can include a block 304 of receiving, at the first system from the first financial institution, payment information regarding a deposit to be made in the second account from the first account to pay the merchant for one or more items to be purchased from the merchant by the consumer for the payment amount. In a number of embodiments, the consumer can use a mobile device at the store of the merchant to pay for the one or more items. The mobile device can be similar or identical to mobile device 120 (FIG. 1). In some embodiments, the mobile device can be running a mobile application associated with the first account. The mobile application can be similar or identical to mobile application 123 (FIG. 1). In many embodiments, the payment information can include a transaction identifier, the account identifier of the second account, and/or the payment amount. In a number of embodiments, the one or more items to be purchased can include at least one of one or more products or one or more services.

In a number of embodiments, method 300 optionally can include a block 305 of storing the payment information in the transaction database.

In many embodiments, method 300 can continue with a block 306 of sending, from the first system to the second financial institution, the payment information such that the second financial institution, upon receiving the payment information, notifies the merchant to satisfy an expectation of the merchant for payment from the consumer.

In some embodiments, the payment information further can include a settlement credit push of funds for the payment amount from the first account to the second account. In other embodiments, the payment information further can include an irrevocable promise to pay the payment amount from the first account to the second account. In several embodiments, the payment information further can include a set of personally identifiable information of the consumer. In a number of embodiments, the set of personally identifiable information can be at least partially based on privacy instructions sent by the consumer to the first financial institution.

Figure 4:
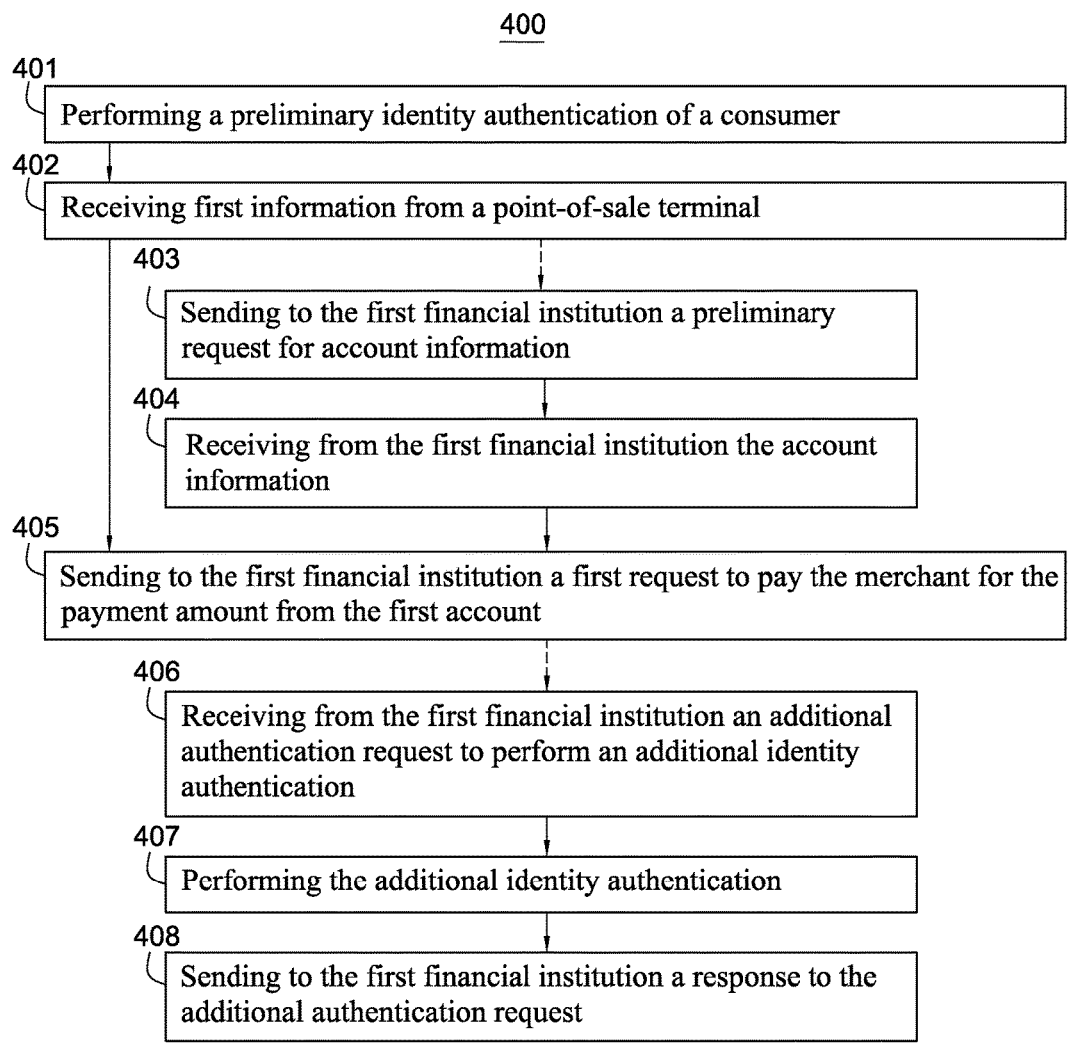
FIG. 4 illustrates a flow chart for a method 400, according to an embodiment.

Turning ahead in the drawings, FIG. 4 illustrates a flow chart for a method 400, according to an embodiment. In some embodiments, method 400 can be a method of facilitating secure payment transactions. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In some embodiments, method 400 can be performed by mobile device 120 (FIG. 1).

Referring to FIG. 4, method 400 can include a block 401 of performing, at a mobile device, a preliminary identity authentication of a consumer using the mobile device. The mobile device can be similar or identical to mobile device 120 (FIG. 1). The consumer can be similar or identical to consumer 125 (FIG. 1).

In many embodiments, method 400 additionally can include a block 402 of receiving at the mobile device first information from a point-of-sale terminal. The point-of-sale terminal can be similar or identical to point-of-sale terminal 110 (FIG. 1). In several embodiments, the first information can include a merchant identifier, a transaction identifier, and/or a payment amount. In some embodiments, the merchant identifier can uniquely correspond to the point-of-sale terminal at a store of a merchant. The merchant can be similar or identical to merchant 115 (FIG. 1). In a number of embodiments, the mobile device can run a mobile application that is associated with a first account of the consumer using the mobile device. The mobile application can be similar or identical to mobile application 123 (FIG. 1). The first account can be similar or identical to consumer account 131 (FIG. 1). In several embodiments, the first account of the consumer can be maintained by a first financial institution. The first financial institution can be similar or identical to financial institution 130 (FIG. 1).

In some embodiments, method 400 optionally can include various blocks before or after block 402 of receiving at the mobile device first information from a point-of-sale terminal. In various embodiments, method 400 can include a block 403 of sending, from the mobile device to the first financial institution, a preliminary request for account information. In several embodiments, the account information can include an account balance and an account status of the first account.

In a number of embodiments, method 400 further optionally can include, after block 403 of sending the preliminary request for account information, a block 404 of receiving, at the mobile device from the first financial institution, the account information.

In many embodiments, method 400 can continue with a block 405 of sending, from the mobile device to the first financial institution, a first request to pay the merchant for the payment amount from the first account for one or more items to be purchased from the merchant by the consumer. In a number of embodiments, the first request can include the first information, such that the first financial institution, upon receiving the first request, can determine second information including an account identifier of a second account of the merchant maintained by a second financial institution, at least partially based on the merchant identifier and third information obtained from a first system, and such that the first financial institution can send to the first system payment information regarding a deposit to be made in the second account from the first account. The second account can be similar or identical to merchant account 151 (FIG. 1). The second financial institution can be similar or identical to financial institution 150 (FIG. 1). The first system can be similar or identical transaction system 140 (FIG. 1).

In a number of embodiments, the payment information can be routed through the first system to the second financial institution such that the second financial institution, upon receiving the payment information, can notify the merchant to satisfy an expectation of the merchant for payment from the consumer. In several embodiments, the first system can be in data communication with the first financial institution and the second financial institution. In various embodiments, the first system can be maintained by an entity that is different from the first financial institution and the second financial institution. In a number of embodiments, the payment information can include the transaction identifier, the account identifier of the second account, and the payment amount. In some embodiments, the payment information further can include one of: (a) a settlement credit push of funds for the payment amount from the first account to the second account, or (b) an irrevocable promise to pay the payment amount from the first account to the second account.

In some embodiments, method 400 optionally can include additional blocks after sending the first request to pay the merchant and before the payment information is sent to the first system from the first financial institution. For example, in a number of embodiments, method 400 optionally can include a block 406 of receiving, at the mobile device from the first financial institution, an additional authentication request to perform an additional identity authentication of the consumer using the mobile device.

In various embodiments, method 400 further can include a block 407 of performing, at the mobile device, the additional identity authentication of the consumer using the mobile device. In many embodiments, block 407 can include performing the additional authentication of the consumer based at least in part on determining biometrics of the consumer using the mobile device and/or requesting the consumer to enter additional information in the mobile device.

In several embodiments, method 400 additionally can include a block 408 of sending, from the mobile device to the first financial institution, a response to the additional authentication request.

Figure 5:
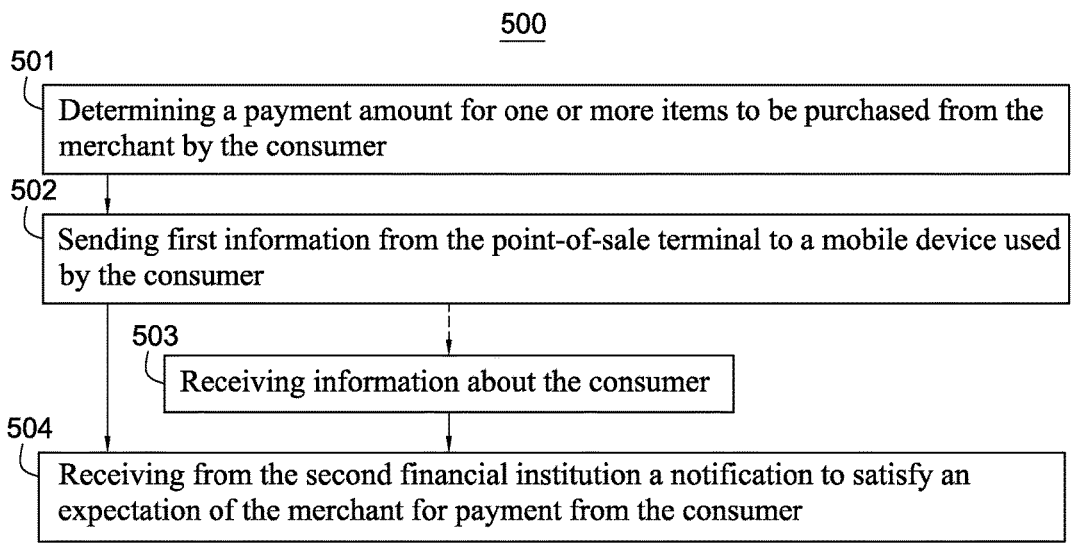
FIG. 5 illustrates a flow chart for a method 500, according to an embodiment.

Turning ahead in the drawings, FIG. 5 illustrates a flow chart for a method 500, according to an embodiment. In some embodiments, method 500 can be a method of facilitating secure payment transactions. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. In some embodiments, method 500 can be performed by point-of-sale terminal 110 (FIG. 1).

Referring to FIG. 5, method 500 can include a block 501 of determining, at a point-of-sale terminal at a store of a merchant, a payment amount for one or more items to be purchased from the merchant by a consumer. The point-of-sale terminal can be similar or identical to point-of-sale terminal 110 (FIG. 1). The merchant can be similar or identical to merchant 115 (FIG. 1). The consumer can be similar of identical to consumer 125 (FIG. 1).

In several embodiments, method 500 additionally can include a block 502 of sending first information from the point-of-sale terminal to a mobile device used by the consumer. The mobile device can be similar or identical to mobile device 120 (FIG. 1). In a number of embodiments, the first information can be sent from the point-of-sale terminal to the mobile device using a proximity-based wireless data protocol. In several embodiments, the first information can include a merchant identifier, a transaction identifier, and/or the payment amount. In a number of embodiments, the merchant identifier can uniquely correspond to the point-of-sale terminal at the store of the merchant. In various embodiments, the mobile device can run a mobile application that is associated with a first account of the consumer using the mobile device. The mobile application can be similar or identical to mobile application 123 (FIG. 1). The first account can be similar or identical to consumer account 131 (FIG. 1). In a number of embodiments, the first account of the consumer can be maintained by a first financial institution. The first financial institution can be similar or identical to financial institution 130 (FIG. 1). In several embodiments, the mobile device, upon receiving the first information, can send a first request to pay the merchant for the payment amount from the first account. In a number of embodiments, the first request can include the first information, such that the first financial institution, upon receiving the first request, can determine second information including an account identifier of a second account of the merchant maintained by a second financial institution, at least partially based on the merchant identifier and third information obtained from a first system, and such that the first financial institution sends to the first system payment information regarding a deposit to be made in the second account from the first account. The second account can be similar or identical to merchant account 151 (FIG. 1). The second financial institution can be similar or identical to financial institution 150 (FIG. 1). The first system can be similar or identical to transaction system 140 (FIG. 1).

In some embodiments, the payment information can be routed through the first system to the second financial institution. In various embodiments, the first system can be in data communication with the first financial institution and the second financial institution. In many embodiments, the first system can be maintained by an entity that is different from the first financial institution and the second financial institution. In several embodiments, the payment information can include the transaction identifier, the account identifier of the second account, and/or the payment amount. in some embodiments, the payment information further can include one of: (a) a settlement credit push of funds for the payment amount from the first account to the second account, or (b) an irrevocable promise to pay the payment amount from the first account to the second account.

In various embodiments, method 500 optionally can include a block 503 of receiving at the point-of-sale terminal from the mobile device, information about the consumer. In some embodiments, block 503 can be performed before or after block 501 of determining the payment amount for the one or more items to be purchased from the merchant by the consumer, before or after block 502 of sending the first information from the point-of-sale terminal to the mobile device used by the consumer, or before or after block 504, described below.

In many embodiments, method 500 can continue with a block 504 of receiving, at the point-of-sale terminal from the second financial institution, a notification to satisfy an expectation of the merchant for payment from the consumer.

Figure 6:
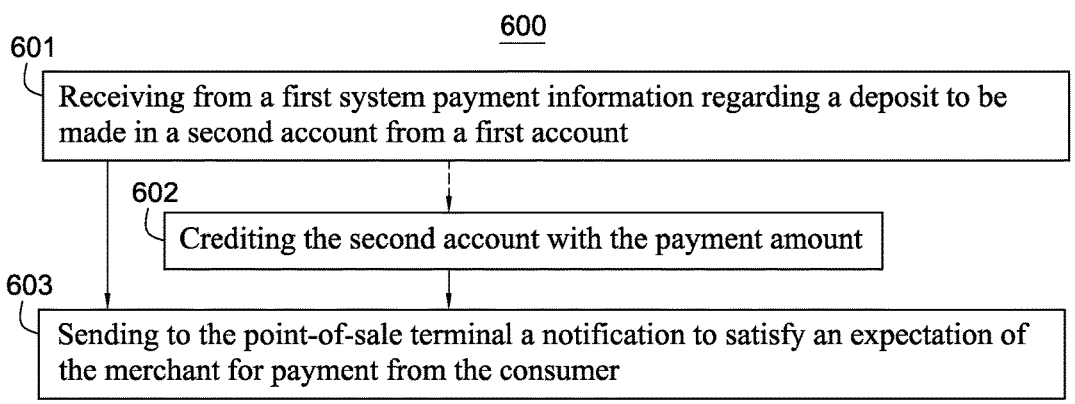
FIG. 6 illustrates a flow chart for a method 600, according to an embodiment.

Turning ahead in the drawings, FIG. 6 illustrates a flow chart for a method 600, according to an embodiment. In some embodiments, method 600 can be a method of facilitating secure payment transactions. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped. In some embodiments, method 600 can be performed by financial institution 150 (FIG. 1).

Referring to FIG. 6, method 600 can include a block 601 of receiving, at a second financial institution from a first system, payment information regarding a deposit to be made in a second account of a merchant maintained by the second financial institution from a first account of a consumer maintained by a first financial institution to pay the merchant for one or more items to be purchased from the merchant by the consumer for the payment amount. The second financial institution can be similar or identical to financial institution 150 (FIG. 1). The first system can be similar or identical to transaction system 140 (FIG. 1). The second account can be similar or identical to merchant account 151 (FIG. 1). The first account can be similar or identical to consumer account 131 (FIG. 1). The consumer can be similar or identical to consumer 125 (FIG. 1). The first financial institution can be similar or identical to financial institution 130 (FIG. 1).

In a number of embodiments, the payment information can be sent from the first financial institution to the first system and routed through the first system to the second financial institution. In several embodiments, the first system can be in data communication with the first financial institution and the second financial institution. In various embodiments, the first system can be maintained by an entity that is different from the first financial institution and the second financial institution. In many embodiments, the consumer can use a mobile device at a store of the merchant to pay for the one or more items. The mobile device can be similar or identical to mobile device 120 (FIG. 1). In a number of embodiments, the mobile device can run a mobile application associated with the first account. The mobile application can be similar or identical to mobile application 123 (FIG. 1). In several embodiments, the payment information can include a transaction identifier, an account identifier of the second account, and/or the payment amount. In a number of embodiments, the first financial institution can determine the account identifier of the second account based on a merchant identifier and based on third information obtained from the first system. In several embodiments, the merchant identifier can uniquely correspond to a point-of-sale terminal at the store of a merchant. The point-of-sale terminal can be similar or identical to point-of-sale terminal 110 (FIG. 1).

In a number of embodiments, the mobile device can send a request to pay the merchant for the payment amount from the first account. In many embodiments, the request can include first information including the merchant identifier, a transaction identifier, and/or the payment amount. In several embodiments, the payment information further can include one of: (a) a settlement credit push of funds for the payment amount from the first account to the second account, or (b) an irrevocable promise to pay the payment amount from the first account to the second account.

In several embodiments, method 600 optionally can include a block 602 of crediting the second account with the payment amount. For example, after the second financial institution has received the payment information, the second account can be credited with the payment amount.

In many embodiments, method 600 can continue with a block 603 of sending, from the second financial institution to the point-of-sale terminal, a notification to satisfy an expectation of the merchant for payment from the consumer. In some embodiments, block 603 can include notifying the merchant that funds for the payment amount are immediately available in the second account.

Returning again to FIG. 1, as described above, point-of-sale terminal 110 can include one or more modules, such as checkout module 111, communication module 112, payment module 113, and/or consumer information module 114. Point-of-sale terminal 110 and the modules therein are merely exemplary and are not limited to the embodiments presented herein. Point-of-sale terminal 110 can be employed in many different embodiments or examples not specifically depicted or described herein. In some embodiments, certain elements or modules of system 110 can perform various procedures, processes, and/or acts. In other embodiments, the procedures, processes, and/or acts can be performed by other suitable elements or modules.

In many embodiments, checkout module 111 can at least partially perform block 501 (FIG. 5) of determining, at a point-of-sale terminal at a store of a merchant, a payment amount for one or more items to be purchased from the merchant by a consumer.

In several embodiments, communication module 112 can at least partially perform block 502 (FIG. 5) of sending first information from the point-of-sale terminal to a mobile device used by the consumer, block 503 (FIG. 5) of receiving at the point-of-sale terminal from the mobile device, information about the consumer, and/or block 504 (FIG. 5) of receiving, at the point-of-sale terminal from the second financial institution, a notification to satisfy an expectation of the merchant for payment from the consumer.

In a number of embodiments, payment module 113 can at least partially perform block 504 (FIG. 5) of receiving, at the point-of-sale terminal from the second financial institution, a notification to satisfy an expectation of the merchant for payment from the consumer.

In various embodiments, consumer information module 114 can at least partially perform block 503 (FIG. 5) of receiving at the point-of-sale terminal from the mobile device, information about the consumer.

Continuing with FIG. 1, as described above, mobile device 120 can include one or more modules, such as authentication module 121, account module 122, and/or communication module 124. Mobile device 120 and the modules therein are merely exemplary and are not limited to the embodiments presented herein. Mobile device 120 can be employed in many different embodiments or examples not specifically depicted or described herein. In some embodiments, certain elements or modules of mobile device 120 can perform various procedures, processes, and/or acts. In other embodiments, the procedures, processes, and/or acts can be performed by other suitable elements or modules.

In many embodiments, authentication module 121 can at least partially perform block 401 (FIG. 4) of performing, at a mobile device, a preliminary identity authentication of a consumer using the mobile device, and/or block 407 (FIG. 4) of performing, at the mobile device, the additional identity authentication of the consumer using the mobile device.

In several embodiments, account module 122 can at least partially perform block 403 (FIG. 4) of sending, from the mobile device to the first financial institution, a preliminary request for account information, and/or block 404 (FIG. 4) of receiving, at the mobile device from the first financial institution the account information.

In a number of embodiments, communication module 124 can at least partially perform block 402 (FIG. 4) of receiving at the mobile device first information from a point-of-sale terminal, block 403 (FIG. 4) of sending, from the mobile device to the first financial institution, a preliminary request for account information, block 404 (FIG. 4) of receiving, at the mobile device from the first financial institution, the account information, block 405 (FIG. 4) of sending, from the mobile device to the first financial institution, a first request to pay the merchant for the payment amount from the first account for one or more items to be purchased from the merchant by the consumer, block 406 (FIG. 4) of receiving, at the mobile device from the first financial institution, an additional authentication request to perform an additional identity authentication of the consumer using the mobile device, and/or block 408 (FIG. 4) of sending, from the mobile device to the first financial institution, a response to the additional authentication request.

Continuing with FIG. 1, as described above, financial institution 130 can include one or more modules, such as communication module 132, authorization module 133, and/or account module 134. Financial institution 130 and the modules therein are merely exemplary and are not limited to the embodiments presented herein. Financial institution 130 can be employed in many different embodiments or examples not specifically depicted or described herein. In some embodiments, certain elements or modules of financial institution 130 can perform various procedures, processes, and/or acts. In other embodiments, the procedures, processes, and/or acts can be performed by other suitable elements or modules.

In many embodiments, communication module 132 can at least partially perform block 201 (FIG. 2) of receiving, at a first financial institution from a mobile device, a preliminary request for account information, block 202 (FIG. 2) of sending, from the first financial institution to the mobile device, the account information, block 203 (FIG. 2) of receiving, at a first financial institution from a mobile device of a consumer, a first request to pay a merchant for a payment amount from a first account of the consumer maintained by the first financial institution, block 206 (FIG. 2) of sending, from the first financial institution to the first system, a second request to determine the second information, block 207 (FIG. 2) of receiving, at the first financial institution from the first system, the third information, and/or block 212 (FIG. 2) of sending, from the first financial institution to the first system, payment information regarding a deposit to be made in the second account from the first account.

In some embodiments, authorization module 133 can at least partially perform block 208 (FIG. 2) of authorizing, at the first financial institution, a payment from the first account to the second account, and/or block 209 (FIG. 2) of authenticating an identity of the consumer that used the mobile device to send the first request to pay the merchant from the first account.

In a number of embodiments, account module 134 can at least partially perform block 201 (FIG. 2) of receiving, at a first financial institution from a mobile device, a preliminary request for account information, block 202 (FIG. 2) of sending, from the first financial institution to the mobile device, the account information, block 204 (FIG. 2) of determining, at the first financial institution, second information, block 205 (FIG. 2) of determining, at the first financial institution, the second information at least partially based on the merchant identifier and the third information, block 209 (FIG. 2) of authenticating an identity of the consumer that used the mobile device to send the first request to pay the merchant from the first account, block 210 (FIG. 2) of determining a current status of the first account, and/or block 211 (FIG. 2) of determining available funds of the first account.

Continuing with FIG. 1, as described above, transaction system 140 can include one or more modules, such as communication module 143, account module 144, and/or transaction module 145. Transaction system 140 and the modules therein are merely exemplary and are not limited to the embodiments presented herein. Transaction system 140 can be employed in many different embodiments or examples not specifically depicted or described herein. In some embodiments, certain elements or modules of transaction system 140 can perform various procedures, processes, and/or acts. In other embodiments, the procedures, processes, and/or acts can be performed by other suitable elements or modules.

In many embodiments, communication module 143 can at least partially perform block 301 (FIG. 3) of receiving, at a first system from a first financial institution, a request, block 303 (FIG. 3) of sending the first information from the first system to the first financial institution, block 304 (FIG. 3) of receiving, at the first system from the first financial institution, payment information regarding a deposit to be made in the second account from the first account to pay the merchant for one or more items to be purchased from the merchant by the consumer for the payment amount, and/or block 306 (FIG. 3) of sending, from the first system to the second financial institution, the payment information such that the second financial institution, upon receiving the payment information, notifies the merchant to satisfy an expectation of the merchant for payment from the consumer.

In some embodiments, account module 144 can at least partially perform block 302 (FIG. 3) of determining, at the first system, using the merchant account database, first information.

In a number of embodiments, transaction module 145 can at least partially perform block 305 (FIG. 3) of storing the payment information in the transaction database.

Continuing with FIG. 1, as described above, financial institution 150 can include one or more modules, such as communication module 152, and/or account module 153. Financial institution 150 and the modules therein are merely exemplary and are not limited to the embodiments presented herein. Financial institution 150 can be employed in many different embodiments or examples not specifically depicted or described herein. In some embodiments, certain elements or modules of financial institution 150 can perform various procedures, processes, and/or acts. In other embodiments, the procedures, processes, and/or acts can be performed by other suitable elements or modules.

In many embodiments, communication module 152 can at least partially perform block 601 (FIG. 6) of receiving, at a second financial institution from a first system, payment information regarding a deposit to be made in a second account of a merchant maintained by the second financial institution from a first account of a consumer maintained by a first financial institution to pay the merchant for one or more items to be purchased from the merchant by the consumer for the payment amount, and/or block 603 (FIG. 6) of sending, from the second financial institution to the point-of-sale terminal, a notification to satisfy an expectation of the merchant for payment from the consumer In various embodiments, account module 153 can at least partially perform block 602 (FIG. 6) of crediting the second account with the payment amount.

Figure 8:
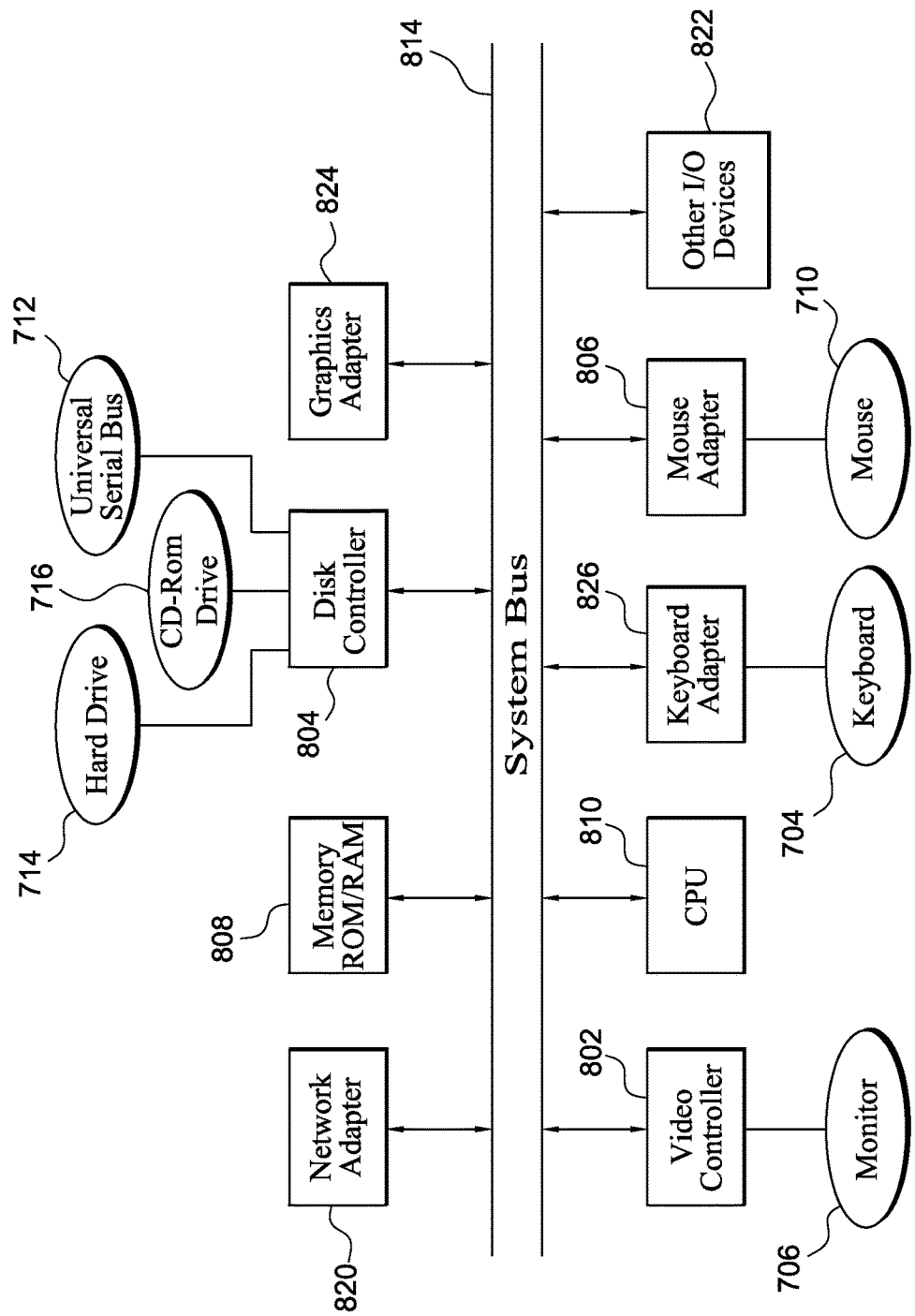
FIG. 8 illustrates a representative block diagram of an example of elements included in circuit boards inside a chassis of the computer of FIG. 7.

Turning ahead in the drawings, FIG. 7 illustrates a computer 700, all of which or a portion of which can be suitable for implementing an embodiment of at least a portion of point-of-sale terminal 110 (FIG. 1), mobile device 120 (FIG. 1), financial institution 130 (FIG. 1), transaction system 140 (FIG. 1), financial institution 150 (FIG. 1), and/or the techniques described in method 200 (FIG. 2), method 300 (FIG. 3), method 400 (FIG. 4), method 500 (FIG. 5), and/or method 600 (FIG. 6). Computer 700 includes a chassis 702 containing one or more circuit boards (not shown), a USB (universal serial bus) port 712, a Compact Disc Read-Only Memory (CD-ROM) and/or Digital Video Disc (DVD) drive 716, and a hard drive 714. A representative block diagram of the elements included on the circuit boards inside chassis 702 is shown in FIG. 8. A central processing unit (CPU) 810 in FIG. 8 is coupled to a system bus 814 in FIG. 8. In various embodiments, the architecture of CPU 810 can be compliant with any of a variety of commercially distributed architecture families.

Continuing with FIG. 8, system bus 814 also is coupled to memory 808 that includes both read only memory (ROM) and random access memory (RAM). Non-volatile portions of memory storage unit 808 or the ROM can be encoded with a boot code sequence suitable for restoring computer 700 (FIG. 7) to a functional state after a system reset. In addition, memory 808 can include microcode such as a Basic Input-Output System (BIOS). In some examples, the one or more memory storage units of the various embodiments disclosed herein can comprise memory storage unit 808, a USB-equipped electronic device, such as, an external memory storage unit (not shown) coupled to universal serial bus (USB) port 712 (FIGS. 7-8), hard drive 714 (FIGS. 7-8), and/or CD-ROM or DVD drive 716 (FIGS. 7-8). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 810.

In the depicted embodiment of FIG. 8, various I/O devices such as a disk controller 804, a graphics adapter 824, a video controller 802, a keyboard adapter 826, a mouse adapter 806, a network adapter 820, and other I/O devices 822 can be coupled to system bus 814. Keyboard adapter 826 and mouse adapter 806 are coupled to a keyboard 704 (FIGS. 7 and 8) and a mouse 710 (FIGS. 7 and 8), respectively, of computer 700 (FIG. 7). While graphics adapter 824 and video controller 802 are indicated as distinct units in FIG. 8, video controller 802 can be integrated into graphics adapter 824, or vice versa in other embodiments. Video controller 802 is suitable for refreshing a monitor 706 (FIGS. 7 and 8) to display images on a screen 708 (FIG. 7) of computer 700 (FIG. 7). Disk controller 804 can control hard drive 714 (FIGS. 7 and 8), USB port 712 (FIGS. 7 and 8), and CD-ROM or DVD drive 716 (FIGS. 7 and 8). In other embodiments, distinct units can be used to control each of these devices separately.

In some embodiments, network adapter 820 can comprise and/or be implemented as a WNIC (wireless network interface controller) card (not shown) plugged or coupled to an expansion port (not shown) in computer system 700 (FIG. 7). In other embodiments, the WNIC card can be a wireless network card built into computer system 700 (FIG. 7). A wireless network adapter can be built into computer system 700 (FIG. 7) by having wireless communication capabilities integrated into the motherboard chipset (not shown), or implemented via one or more dedicated wireless communication chips (not shown), connected through a PCI (peripheral component interconnector) or a PCI express bus of computer system 700 (FIG. 7) or USB port 712 (FIG. 7). In other embodiments, network adapter 820 can comprise and/or be implemented as a wired network interface controller card (not shown).

Although many other components of computer 700 (FIG. 7) are not shown, such components and their interconnection are well known to those of ordinary skill in the art. Accordingly, further details concerning the construction and composition of computer 700 and the circuit boards inside chassis 702 (FIG. 7) need not be discussed herein.

When computer 700 in FIG. 7 is running, program instructions stored on a USB drive in USB port 712, on a CD-ROM or DVD in CD-ROM and/or DVD drive 716, on hard drive 714, or in memory 808 (FIG. 8) are executed by CPU 810 (FIG. 8). A portion of the program instructions, stored on these devices, can be suitable for carrying out all or at least part of the techniques described herein. In various embodiments, computer 700 can be reprogrammed with one or more modules, applications, and/or databases to convert a general purpose computer to a special purpose computer.

Although computer system 700 is illustrated as a desktop computer in FIG. 7, there can be examples where computer system 700 may take a different form factor while still having functional elements similar to those described for computer system 700. In some embodiments, computer system 700 may comprise a single computer, a single server, or a cluster or collection of computers or servers, or a cloud of computers or servers. Typically, a cluster or collection of servers can be used when the demand on computer system 700 exceeds the reasonable capability of a single server or computer. In certain embodiments, computer system 700 may comprise a portable computer, such as a laptop computer. In certain other embodiments, computer system 700 may comprise a mobile device, such as a smartphone. For example, mobile device 120 (FIG. 1) can be a mobile device, such as a smartphone. In certain additional embodiments, computer system 700 may comprise an embedded system.

Although secure real-time payment transactions have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 2-6 may include different procedures, processes, and/or activities and be performed by many different modules, in many different orders, and/or one or more of the procedures, processes, or activities of FIGS. 2-6 may include one or more of the procedures, processes, or activities of another different one of FIGS. 2-6.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method being implemented via execution of computer instructions configured to run at one or more processors and configured to be stored at one or more non-transitory computer-readable media, the method comprising:

performing, at a mobile device, a preliminary identity authentication of a consumer using the mobile device;

receiving at the mobile device first information from a point-of-sale terminal, the first information comprising a merchant identifier, a transaction identifier for a transaction, and a payment amount for the transaction, the merchant identifier uniquely corresponding to a merchant, and the mobile device running a mobile application that is associated with a consumer account of the consumer using the mobile device, the consumer account being maintained by a consumer financial institution; and sending, from the mobile device to the consumer financial institution, a first request to (1) pay the merchant for the payment amount from the consumer account for one or more items to be purchased from the merchant by the consumer in the transaction, the first request comprising the first information, (2) cause the consumer financial institution, upon receiving the first request, to call a transaction system to determine second information comprising an account identifier of a merchant account of the merchant maintained by a merchant financial institution, and (3) cause the consumer financial institution to send to the transaction system payment information regarding a deposit to be made in the merchant account from the consumer account, wherein:

the transaction system determines the account identifier of the merchant account using a merchant account database and the merchant identifier;

the merchant account database comprises a plurality of merchant identifiers being associated with a plurality of merchants, a plurality of account identifiers associated with the plurality of merchants, and a mapping between the plurality of merchant identifiers and the plurality of account identifiers;

the plurality of merchants comprise the merchant;

the plurality of merchant identifiers comprise the merchant identifier;

the plurality of account identifiers comprise the account identifier of the merchant account;

the payment information is routed through the transaction system to the merchant financial institution to cause the merchant financial institution, upon receiving the payment information, to notify the merchant in real-time of payment from the consumer while the consumer remains at a store of the merchant;

the transaction system is in data communication with the consumer financial institution and the merchant financial institution;

the transaction system is maintained by an entity that is different from the merchant, the consumer financial institution, and the merchant financial institution;

the payment information comprises the transaction identifier, the account identifier of the merchant account, and the payment amount;

the payment information further comprises one of: (a) a settlement credit push of funds for the payment amount from the consumer account to the merchant account, or (b) an irrevocable promise to pay the payment amount from the consumer account to the merchant account, to eliminate chargebacks to the merchant for the transaction;

the merchant does not receive an account identifier of the consumer account to increase security of the account identifier of the consumer account and to prevent fraud occurring for the consumer account resulting from the transaction;

the consumer does not receive the account identifier of the merchant account of the merchant to increase security of the account identifier of the merchant account and to prevent fraud occurring for the merchant account resulting from the transaction; and the merchant financial institution notifies the merchant in real-time of payment from the consumer while the consumer remains at the store of the merchant by sending a notification of good funds in real-time from the merchant financial institution to the point-of-sale terminal to indicate that the transaction has cleared.

2. The method of claim 1, further comprising, after sending the first request to pay the merchant and before the payment information is sent to the transaction system from the consumer financial institution:

receiving, at the mobile device from the consumer financial institution, an additional authentication request to perform an additional identity authentication of the consumer using the mobile device;

performing, at the mobile device, the additional identity authentication of the consumer using the mobile device; and sending, from the mobile device to the consumer financial institution, a response to the additional authentication request.

3. The method of claim 2, wherein performing the additional identity authentication of the consumer comprises performing the additional identity authentication of the consumer based at least in part on at least one of:

determining biometrics of the consumer using the mobile device; or requesting the consumer to enter additional information in the mobile device.

4. The method of claim 1, further comprising, prior to sending the first request to pay the merchant:

sending, from the mobile device to the consumer financial institution, a preliminary request for account information; and receiving, at the mobile device from the consumer financial institution, the account information comprising an account balance and an account status of the consumer account.

5. The method of claim 2, wherein:

the first information further comprises an identification of the one or more items to be purchased; and performing the additional identity authentication of the consumer further comprises:

authenticating an identity of the consumer based at least in part on the identification of the one or more items to be purchased by the consumer for the payment amount from the merchant.

6. The method of claim 3, wherein performing the additional identity authentication of the consumer further comprises:

adjusting a level of authentication based on at least one of:

the payment amount to be paid to the merchant, whether the mobile device has previously been used by the consumer in transactions involving the consumer financial institution, whether the biometrics of the consumer determined using the mobile device match stored biometrics of the consumer, or whether at least one of an identity of the merchant, a location of the merchant, the payment amount, or the one or more items to be purchased is consistent with historical patterns of behavior by the consumer.

7. The method of claim 1, wherein the second information further comprises:

a name of the merchant; and a location of the store of the merchant.

8. The method of claim 1, wherein:

the one or more items to be purchased comprise at least one of one or more goods or one or more services.

9. The method of claim 1, wherein:

the payment information further comprises a set of personally identifiable information of the consumer; and the set of personally identifiable information is based on privacy instructions sent by the consumer from the mobile device to the consumer financial institution.

10. The method of claim 1, wherein:

the merchant identifier further uniquely corresponds to the point-of-sale terminal; and the point-of-sale terminal is located at the store of the merchant.

11. The method of claim 1, wherein:

the first information is received from the point-of-sale terminal using a proximity-based wireless data communication protocol.

12. A system comprising:

one or more processors; and one or more non-transitory computer-readable media storing computing instructions configured to run on the one or more processors and perform:

performing, at a mobile device, a preliminary identity authentication of a consumer using the mobile device;

receiving at the mobile device first information from a point-of-sale terminal, the first information comprising a merchant identifier, a transaction identifier for a transaction, and a payment amount for the transaction, the merchant identifier uniquely corresponding to a merchant, and the mobile device running a mobile application that is associated with a consumer account of the consumer using the mobile device, the consumer account being maintained by a consumer financial institution; and sending, from the mobile device to the consumer financial institution, a first request to (1) pay the merchant for the payment amount from the consumer account for one or more items to be purchased from the merchant by the consumer in the transaction, the first request comprising the first information, (2) cause the consumer financial institution, upon receiving the first request, to call a transaction system to determine second information comprising an account identifier of a merchant account of the merchant maintained by a merchant financial institution, and (3) cause the consumer financial institution to send to the transaction system payment information regarding a deposit to be made in the merchant account from the consumer account, wherein:

the transaction system determines the account identifier of the merchant account using a merchant account database and the merchant identifier;

the merchant account database comprises a plurality of merchant identifiers being associated with a plurality of merchants, a plurality of account identifiers associated with the plurality of merchants, and a mapping between the plurality of merchant identifiers and the plurality of account identifiers;

the plurality of merchants comprise the merchant;

the plurality of merchant identifiers comprise the merchant identifier;

the plurality of account identifiers comprise the account identifier of the merchant account;

the payment information is routed through the transaction system to the merchant financial institution to cause the merchant financial institution, upon receiving the payment information, to notify the merchant in real-time of payment from the consumer while the consumer remains at a store of the merchant;

the transaction system is in data communication with the consumer financial institution and the merchant financial institution;

the transaction system is maintained by an entity that is different from the merchant, the consumer financial institution, and the merchant financial institution;

the payment information comprises the transaction identifier, the account identifier of the merchant account, and the payment amount;

the payment information further comprises one of: (a) a settlement credit push of funds for the payment amount from the consumer account to the merchant account, or (b) an irrevocable promise to pay the payment amount from the consumer account to the merchant account, to eliminate chargebacks to the merchant for the transaction;

the merchant does not receive an account identifier of the consumer account to increase security of the account identifier of the consumer account and to prevent fraud occurring for the consumer account resulting from the transaction;

the consumer does not receive the account identifier of the merchant account of the merchant to increase security of the account identifier of the merchant account and to prevent fraud occurring for the merchant account resulting from the transaction; and the merchant financial institution notifies the merchant in real-time of payment from the consumer while the consumer remains at the store of the merchant by sending a notification of good funds in real-time from the merchant financial institution to the point-of-sale terminal to indicate that the transaction has cleared.

13. The system of claim 12, wherein the computing instructions are further configured to perform, after sending the first request to pay the merchant and before the payment information is sent to the transaction system from the consumer financial institution:

receiving, at the mobile device from the consumer financial institution, an additional authentication request to perform an additional identity authentication of the consumer using the mobile device;

performing, at the mobile device, the additional identity authentication of the consumer using the mobile device; and sending, from the mobile device to the consumer financial institution, a response to the additional authentication request.

14. The system of claim 13, wherein performing the additional identity authentication of the consumer comprises performing the additional identity authentication of the consumer based at least in part on at least one of:

determining biometrics of the consumer using the mobile device; or requesting the consumer to enter additional information in the mobile device.

15. The system of claim 14, wherein performing the additional identity authentication of the consumer further comprises:

adjusting a level of authentication based on at least one of:
the payment amount to be paid to the merchant,
whether the mobile device has previously been used by the consumer in transactions involving the consumer financial institution,
whether the biometrics of the consumer determined using the mobile device match stored biometrics of the consumer, or
whether at least one of an identity of the merchant, a location of the merchant, the payment amount, or the one or more items to be purchased is consistent with historical patterns of behavior by the consumer.

16. The system of claim 13, wherein:

the first information further comprises an identification of the one or more items to be purchased; and performing the additional identity authentication of the consumer further comprises:
authenticating an identity of the consumer based at least in part on the identification of the one or more items to be purchased by the consumer for the payment amount from the merchant.

17. The system of claim 12, wherein the computing instructions are further configured to perform, prior to sending the first request to pay the merchant:

sending, from the mobile device to the consumer financial institution, a preliminary request for account information; and receiving, at the mobile device from the consumer financial institution, the account information comprising an account balance and an account status of the consumer account.

18. The system of claim 12, wherein the second information further comprises:
- a name of the merchant; and
- a location of the store of the merchant.

19. The system of claim 12, wherein:
- the one or more items to be purchased comprise at least one of one or more goods or one or more services.

20. The system of claim 12, wherein:
- the payment information further comprises a set of personally identifiable information of the consumer; and
- the set of personally identifiable information is based on privacy instructions sent by the consumer from the mobile device to the consumer financial institution.

21. The system of claim 12, wherein:
- the merchant identifier further uniquely corresponds to the point-of-sale terminal; and
- the point-of-sale terminal is located at the store of the merchant.

22. The system of claim 12, wherein:
- the first information is received from the point-of-sale terminal using a proximity-based wireless data communication protocol.

\* \* \* \* \*